United States Patent
Modin

(10) Patent No.: US 12,118,428 B2
(45) Date of Patent: Oct. 15, 2024

(54) USING DISTANCE SENSOR DELTA TO DETERMINE WHEN TO ENTER PRESENTATION MODE

(71) Applicant: OMRON Corporation, Kyoto (JP)

(72) Inventor: Mitch Modin, Renton, WA (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/895,994

(22) Filed: Aug. 25, 2022

(65) Prior Publication Data
US 2024/0070415 A1 Feb. 29, 2024

(51) Int. Cl.
G06K 7/14 (2006.01)
G01B 21/18 (2006.01)
G01S 13/08 (2006.01)

(52) U.S. Cl.
CPC ........... G06K 7/1413 (2013.01); G01B 21/18 (2013.01); G01S 13/08 (2013.01)

(58) Field of Classification Search
CPC .. G06K 7/1413; G06K 7/10881; G06K 7/109; G01B 21/18; G01S 13/08
USPC ..... 235/462.45, 472.01, 462.43, 462.01, 454
See application file for complete search history.

(56) References Cited

U.S. PATENT DOCUMENTS

| | | |
|---|---|---|
| 4,097,729 A | 6/1978 | Seligman et al. |
| 4,766,297 A | 8/1988 | McMillan |
| 5,841,121 A | 11/1998 | Koenck |
| 5,883,375 A | 3/1999 | Knowles et al. |
| 5,992,744 A | 11/1999 | Smith et al. |
| 7,748,629 B2 | 7/2010 | Brock |
| 8,864,035 B2 | 10/2014 | Fukuba |
| 9,152,834 B2 | 10/2015 | Madej et al. |
| 9,202,094 B1 | 12/2015 | Chen et al. |
| 9,811,705 B1 | 11/2017 | Suman |
| 9,857,166 B2 | 1/2018 | Higo et al. |
| 10,175,489 B1 | 1/2019 | Robbins et al. |

(Continued)

FOREIGN PATENT DOCUMENTS

| | | |
|---|---|---|
| CN | 111602069 A | 8/2020 |
| JP | H08-263583 A | 10/1996 |

(Continued)

OTHER PUBLICATIONS

Extended European Search dated Jan. 29, 2024, issued in corresponding European Patent Application No. 23188558.3.

(Continued)

*Primary Examiner* — Edwyn Labaze
(74) *Attorney, Agent, or Firm* — Morgan, Lewis & Bockius LLP

(57) ABSTRACT

An apparatus includes a distance sensor, an image sensor, one or more processors, and memory. The memory stores one or more programs configured for execution by the one or more processors. The apparatus measures a baseline depth. The apparatus measures a first depth subsequent to measuring the baseline depth. The apparatus determines that the first depth is different from the baseline depth. In response to the determination, the apparatus activates a read cycle. Subsequent to activating the read cycle, the apparatus measures a second depth. The apparatus detects that the second depth is within a threshold range of the baseline depth. In response to the detection, the apparatus deactivates the read cycle.

20 Claims, 13 Drawing Sheets

(56) References Cited

U.S. PATENT DOCUMENTS

| | | | |
|---|---|---|---|
| 10,410,373 | B1 | 9/2019 | Hall et al. |
| 10,534,944 | B1 | 1/2020 | Brock |
| 10,855,973 | B1 | 12/2020 | Hall et al. |
| 11,169,268 | B1 | 11/2021 | Schaefer |
| 11,381,729 | B1* | 7/2022 | Poloniewicz ............. G06T 9/00 |
| 2005/0040632 | A1 | 2/2005 | Matsuda et al. |
| 2006/0289654 | A1* | 12/2006 | Robinson ........... G06K 7/10881 235/462.46 |
| 2007/0176003 | A1 | 8/2007 | Brock |
| 2008/0061937 | A1 | 3/2008 | Park |
| 2010/0155485 | A1 | 6/2010 | Tan et al. |
| 2011/0008035 | A1 | 1/2011 | Messina et al. |
| 2013/0200150 | A1 | 8/2013 | Reynolds et al. |
| 2014/0333997 | A1 | 11/2014 | Oda |
| 2014/0374485 | A1 | 12/2014 | Xian et al. |
| 2015/0028103 | A1 | 1/2015 | Jiang |
| 2015/0054946 | A1 | 2/2015 | Zhang |
| 2016/0104019 | A1* | 4/2016 | Todeschini ........... G06K 7/1426 235/472.01 |
| 2016/0117561 | A1 | 4/2016 | Miyazawa et al. |
| 2017/0289451 | A1 | 10/2017 | Wittenberg et al. |
| 2018/0007328 | A1 | 1/2018 | Kursula et al. |
| 2018/0080761 | A1 | 3/2018 | Takao et al. |
| 2018/0121695 | A1* | 5/2018 | Ynclino, V ............ G06Q 20/20 |
| 2018/0313644 | A1 | 11/2018 | Glinec |
| 2019/0122057 | A1 | 4/2019 | Kimura |
| 2019/0130150 | A1 | 5/2019 | Handshaw et al. |
| 2019/0184570 | A1 | 6/2019 | Yung et al. |
| 2019/0303636 | A1 | 10/2019 | Olivastri |
| 2019/0370515 | A1 | 12/2019 | Fuji |
| 2020/0132849 | A1 | 4/2020 | Moebius et al. |
| 2020/0297446 | A1 | 9/2020 | Brassett et al. |
| 2020/0309916 | A1 | 10/2020 | Kimura |
| 2020/0320263 | A1 | 10/2020 | Kubota et al. |
| 2021/0041534 | A1 | 2/2021 | Egawa |
| 2021/0152742 | A1 | 5/2021 | Schneider et al. |
| 2021/0286319 | A1 | 9/2021 | Cole |
| 2021/0385374 | A1 | 12/2021 | Giordano et al. |
| 2022/0058351 | A1 | 2/2022 | Naito et al. |
| 2022/0180541 | A1* | 6/2022 | Zweigle ................ H04N 23/45 |
| 2022/0319205 | A1 | 10/2022 | Kurtoglu et al. |
| 2023/0114004 | A1 | 4/2023 | Gurevich et al. |
| 2023/0152455 | A1 | 5/2023 | Cole |
| 2023/0161041 | A1 | 5/2023 | Schindler et al. |

FOREIGN PATENT DOCUMENTS

| | | |
|---|---|---|
| JP | 2009-044459 A | 2/2009 |
| JP | 2009-169931 A | 7/2009 |
| JP | 2013-168067 A | 8/2013 |
| JP | 2020-027043 A | 2/2020 |
| JP | 2020-170366 A | 10/2020 |
| WO | 2020/131204 A1 | 6/2020 |
| WO | 2022/015443 A1 | 1/2022 |

OTHER PUBLICATIONS

Extended European Search dated Jan. 29, 2024, issued in related European Patent Application No. 23188556.7.

Extended European Search dated Jan. 22, 2024, issued in related European Patent Application No. 23188557.5.

Office Action dated Jul. 9, 2024, issued in related Japanese Patent Application No. 2023-130834.

* cited by examiner

Figure 4A

USING DISTANCE SENSOR DELTA TO DETERMINE WHEN TO ENTER PRESENTATION MODE

RELATED APPLICATIONS

This application is related to the following applications, each of which is incorporated by reference herein in its entirety:
(i) U.S. Patent Application Ser. No. 17/895,991, filed on Aug. 25, 2022, entitled "Scanning Device Utilizing Separate Light Pattern Sequences Based on Measured Distance to Scanned Objects";
(ii) U.S. Patent Application Ser. No. 17/895,993, filed on Aug. 25, 2022, entitled "Symbology or Frame Rate Changes Based on Target Distance";
(iii) U.S. patent application Ser. No. 13/233,535, filed Sep. 15, 2011, entitled "Methods for Providing Diffuse Light," now U.S. Pat. No. 8,224,174, issued on Jun. 27, 2012; and
(iv) U.S. patent application Ser. No. 14/298,659, filed Jun. 6, 2014, entitled "Combination Dark Field and Bright Field Illuminator," now U.S. Pat. No. 8,989,569, issued on Mar. 24, 2015.

TECHNICAL FIELD

The disclosed implementations relate generally to optical data-reading devices (e.g., scanning devices) and more specifically to systems, devices, and methods for reading and decoding symbols.

BACKGROUND

Optical data-reading systems and devices (e.g., scanning devices) enable identification and tracking of parts, by capturing a two-dimensional image of a symbol (e.g., a barcode, a label, or a part marking) that is included on a part, and analyzing that image to extract the information contained in the symbol.

SUMMARY

One of the challenges in optical data-reading systems is obtaining good quality images that can be decoded. For example, symbols used in the automotive industry tend to be directly milled, punched, or etched onto parts that are of different sizes and surfaces (e.g., smooth, rough, reflective, shiny, dull, or corrugated). In some instances, an adjacent part can create shadowing effects that makes it difficult to scan and read the symbol. Because of the wide range of dimensions and surfaces, camera settings (e.g., type of illumination, exposure, and/or gain settings) for optical data-reading systems tend to be specific to the parts to be imaged.

Another challenge in optical reading systems is the activation of read cycles. Oftentimes, the systems operate in a continuous capture/read mode whereby the imaging system continuously acquires images to look for data labels in the images, even when there is no object and/or symbol in the vicinity. Consequently, systems operating in this mode consume unnecessary power and generate a lot of heat. Furthermore, a user may find the continuous flashing lights from the camera uncomfortable.

Accordingly, there is a need for improved devices, methods, and systems that enable high quality images of barcodes to be captured at high efficiency while improving user satisfaction.

The present disclosure describes a scanning device that improves the effectiveness of image capture by measuring the distance between the device and a target object (e.g., a part that includes a barcode).

According to some embodiments, the disclosed device automatically selects a lighting pattern sequence that is configured for a distance range corresponding to the measured distance, and illuminates the target object using the lighting pattern sequence. In some embodiments, the lighting pattern sequence includes one or more lighting patterns that are arranged according to the probability (e.g., decreasing probability) that a successful read will be obtained. In some embodiments, when the disclosed device obtained a good read in a previous read cycle, and determines that the current read cycle is in the same distance range as the previous read cycle, the device starts with the lighting pattern that was used to obtain the good read in the previous cycle.

According to some embodiments, based on the measured distance, the disclosed device automatically identifies, from predefined symbology types, a subset of symbology types corresponding to the measuring distance. The disclosed device acquires an image of the object and decodes the image using the subset of symbology types.

According to some embodiments, instead of operating in a continuous capture/read mode, the disclosed device is in a default idle state (e.g., a presentation mode). The disclosed device activates a read cycle when the measured distance changes (e.g., changes from the baseline depth), and deactivates the read cycle upon detecting that the measured distance has returned to substantially the original baseline depth.

Accordingly, the device and/or methods disclosed herein advantageously improve the device and its operation in the following ways.

First, by automatically activating separate lighting pattern sequences based on target distance, the disclosed device can read more label markings because the lighting patterns in the sequence are tailored for the specific distance range. This leads to higher productivity and greater user satisfaction.

Second, reducing symbology type candidates to a subset of symbology types can lead to improved device performance, because every symbology type that is enabled in the device uses a finite amount of processing time (e.g., by increasing the amount of data the processor needs to identify and/or match in order to decode the marking). Accordingly, by reducing the number of symbology types, more processing capabilities can be channeled toward the image capture and decode parts of the pipeline.

Third, by keeping the disclosed device in an idle state and activating the read cycle when there is an object within view, the disclosed device uses less power and is less prone to overheating. The user experience also improves because a user no longer has to deal with continuous flashing lights from the image capture system.

The devices and methods of this disclosure each have several innovative aspects, no single one of which is solely responsible for the desirable attributes disclosed herein.

In accordance with some embodiments of the present disclosure, an apparatus includes a distance sensor, a plurality of light sources, one or more processors, and memory coupled to the one or more processors. The memory stores one or more programs configured for execution by the one or more processors. The one or more programs include instructions for determining, via the distance sensor, the distance between an object and the apparatus. The one or more programs include instructions for: when the distance between the object and the apparatus is within a first distance range of a plurality of predefined distance ranges, activating a first sequence of lighting patterns, corresponding to the first distance range, to illuminate the object via the plurality of light sources.

In some embodiments, the apparatus further includes an image sensor. The one or more programs further include instructions for repeating the steps of determining and activating until an image of the object is captured by the image sensor.

In some embodiments, the first sequence of lighting patterns includes a plurality of lighting patterns. The one or more programs further include instructions for determining that a first lighting pattern of the plurality of lighting patterns is activated when the image of the object is captured. The one or more programs further include instructions for: during a subsequent operation of the apparatus, re-ordering the plurality of lighting patterns in the first sequence of lighting patterns so that the first lighting pattern is activated first.

In some embodiments, the apparatus of claim 1 further includes a camera having a lens and an image sensor, for acquiring one or more images of the object.

In some embodiments, the first sequence of lighting patterns includes a plurality of lighting patterns. Each of the lighting patterns uses a distinct combination of light sources and/or lighting characteristics to illuminate the object. The one or more programs include instructions for activating the plurality of lighting patterns according to a predefined order. The predefined order is based on a probability that a respective lighting pattern will create contrast between light and dark portions of the object.

In some instances, the predefined order is based on a decreasing order of probability.

In some embodiments, the plurality of light sources includes: a long range light source, a low angle light source, and/or a dome light source.

In some embodiments, the plurality of light sources includes an inward-facing light source and an outward-facing light source.

In some embodiments, the plurality of light sources includes a first light source having a first color and a second light source having a second color that is distinct from the first color.

In some embodiments, the plurality of distance ranges includes a near field distance range, a medium field distance range, and a far field distance range.

In some embodiments, each distance range of the plurality of distance ranges corresponds to a unique sequence of lighting patterns.

In some embodiments, the distance sensor is one of: a time-of-flight sensor, an ultrasonic sensor, a radar sensor, or a LiDAR sensor.

In accordance with some embodiments, a method is performed by an apparatus. The apparatus has a distance sensor and a plurality of light sources. The method includes determining, via the distance sensor, the distance between an object and the apparatus. The method includes, when the distance between the object and the apparatus is within a first distance range of a plurality of predefined distance ranges, activating a first sequence of lighting patterns. The first sequence of lighting patterns corresponds to the first distance range. The first sequence of lighting patterns illuminates the object via the plurality of light sources.

In some embodiments, the apparatus includes an image sensor. The method includes repeating the steps of determining and activating until an image of the object is captured by the image sensor.

In some embodiments, the first sequence of lighting patterns includes a plurality of lighting patterns. The method includes determining that a first lighting pattern of the plurality of lighting patterns is activated when the image of the object is captured. The method includes, during a subsequent operation of the apparatus, re-ordering the plurality of lighting patterns in the first sequence of lighting patterns so that the first lighting pattern is activated first.

In some embodiments, the first sequence of lighting patterns includes a plurality of lighting patterns. Each of the lighting patterns using a distinct combination of light sources and/or lighting characteristics to illuminate the object. The method includes activating the plurality of lighting patterns according to a predefined order, based on a probability that a respective lighting pattern will create contrast between light and dark portions of the object.

In accordance with some embodiments of the present disclosure, a system comprises a distance sensor, a plurality of light sources, one or more processors, and memory coupled to the one or more processors. The memory stores one or more programs configured for execution by the one or more processors. The one or more programs include instructions for determining, via the distance sensor, the distance between an object and the system. The one or more programs include instructions for: when the distance between the object and the system is within a first distance range of a plurality of predefined distance ranges, activating a first sequence of lighting patterns, corresponding to the first distance range, to illuminate the object via the plurality of light sources. The system includes a camera for capturing one or more images of the object.

In accordance with some embodiments of the present disclosure, an apparatus includes a distance sensor, an image sensor, one or more processors, and memory coupled to the one or more processors. The memory stores one or more programs configured for execution by the one or more processors. The one or more programs include instructions for determining, via the distance sensor, the distance between an object and the apparatus. The one or more programs include instructions for, when the distance between the object and the apparatus is within a first distance range of a plurality of predefined distance ranges, identifying a subset of symbology types, from a plurality of predefined symbology types, corresponding to the first distance range. The one or more programs also include instructions for acquiring one or more images of the object and decoding the one or more images based on the identified subset of symbology types.

In some embodiments, the plurality of distance ranges includes two or more of: a near field distance range, a medium field distance range, and a far field distance range.

In some embodiments, the one or more programs further include instructions for adjusting the image acquisition rate for acquiring the one or more images based on the distance between the apparatus and the object.

In some embodiments, the instructions for adjusting the image acquisition rate include instructions for increasing the image acquisition rate when the distance between the apparatus and the object increases.

In some embodiments, the instructions for decoding the one or more images based on the identified subset of symbology types include instructions for: identifying one or more object features from the one or more images; comparing the object features with respective features of symbology types in the subset of symbology types; determining, according to the comparing, that the object corresponds to a first symbology type in the subset of symbology types; and decoding the one or more object features based on the first symbology type.

In some embodiments, the distance sensor is one of: a time-of-flight sensor, an ultrasonic sensor, a radar sensor, or a LiDAR sensor.

In some embodiments, the apparatus includes a plurality of light sources. The one or more programs further include instructions for, when the distance between the object and the apparatus is within the first distance range of the plurality of predefined distance ranges, activating a first sequence of lighting patterns, corresponding to the first distance range, to illuminate the object via the plurality of light sources.

In some embodiments, the plurality of symbology types is stored locally on the apparatus.

In some embodiments, the plurality of symbology types is stored on a computer device, distinct from the apparatus.

In some embodiments, the image sensor is part of a camera. The camera further includes a lens.

In some embodiments, the plurality of symbology types includes a linear symbology and a 2D symbology.

In accordance with some embodiments of the present disclosure, a method is performed by an apparatus. The apparatus includes a distance sensor and an image sensor. The method comprises determining, via the distance sensor, a distance between an object and the apparatus. The method comprises, when the distance between the object and the apparatus is within a first distance range of a plurality of predefined distance ranges, identifying a subset of symbology types, from a plurality of predefined symbology types, corresponding to the first distance range. The method comprises acquiring one or more images of the object. The method comprises decoding the one or more images based on the identified subset of symbology types.

In some embodiments, the method further comprises adjusting the image acquisition rate for acquiring the one or more images based on a distance between the apparatus and the object.

In some instances, adjusting the image acquisition rate includes increasing the image acquisition rate when the distance between the apparatus and the object increases (e.g., decreasing the image acquisition rate when the distance between the apparatus and the object decreases).

In some embodiments, decoding the one or more images based on the identified subset of symbology types includes: (i) identifying one or more object features from the one or more images; (ii) comparing the object features with respective features of symbology types in the subset of symbology types; (iii) determining, according to the comparing, that the object corresponds to a first symbology type in the subset of symbology types; and (iv) decoding the one or more object features based on the first symbology type.

In some embodiments, the apparatus includes a plurality of light sources. The method further includes, when the distance between the object and the apparatus is within the first distance range of the plurality of predefined distance ranges, activating a first sequence of lighting patterns, corresponding to the first distance range, to illuminate the object via the plurality of light sources.

In accordance with some embodiments of the present disclosure, a method is performed by an apparatus. The apparatus includes a distance sensor, an image sensor, one or more processors, and memory. The method includes measuring a baseline depth. The method includes, subsequent to measuring the baseline depth, measuring a first depth. The method includes determining that the first depth is different from the baseline depth. The method includes, in response to the determination, activating a read cycle. The method includes, subsequent to activating the read cycle, measuring a second depth. The method includes detecting that the second depth is within a threshold range of the baseline depth. The method also includes in response to the detection, deactivating the read cycle.

In some embodiments, the first depth is less than the baseline depth.

In some embodiments, the method further comprises, while the read cycle is activated, capturing an image using the image sensor.

In some embodiments, the captured image includes an image with a barcode.

In some embodiments, the barcode comprises a 1D barcode. In some embodiments, the barcode comprises a 2D barcode.

In some embodiments, the method further comprises decoding the barcode.

In some embodiments, the threshold range comprises an interval based on a percentage range about the baseline depth.

In some embodiments, the threshold range comprises an interval based on an absolute range about the baseline depth.

In some embodiments, the threshold range has a finite lower limit and no upper limit.

In some embodiments, deactivating the read cycle includes deactivating the image sensor.

In some embodiments, the method further comprises determining a rate of change from the baseline depth to the first depth. Activating the read cycle is further in accordance with the determination that the rate of change exceeds a minimum rate of change In some embodiments, the rate of change is determined over a predefined time period.

In accordance with some embodiments of the present disclosure, an apparatus includes a distance sensor, an image sensor, one or more processors, and memory coupled to the one or more processors. The memory stores one or more programs configured for execution by the one or more processors. The one or more programs include instructions for measuring a baseline depth. The one or more programs include instructions for, subsequent to measuring the baseline depth, measuring a first depth. The one or more programs include instructions for determining that the first depth is different from the baseline depth. The one or more programs include instructions for, in response to the determination, activating a read cycle. The one or more programs include instructions for, subsequent to activating the read cycle, measuring a second depth. The one or more programs include instructions for detecting that the second depth is within a threshold range of the baseline depth. The one or more programs also include instructions for in response to the detection, deactivating the read cycle.

In some embodiments, the one or more programs include instructions for capturing an image using the image sensor while the read cycle is activated.

In some embodiments, the one or more programs include instructions for decoding the barcode (e.g., a 1D barcode or a 2D barcode).

In some embodiments, the instructions for deactivating the read cycle include instructions for deactivating the image sensor.

In some embodiments, the one or more programs include instructions for determining a rate of change from the baseline depth to the first depth. Activating the read cycle is further in accordance with the determination that the rate of change exceeds a minimum rate of change.

In some embodiments, the distance sensor is one of: a time-of-flight sensor, an ultrasonic sensor, an infrared (IR) sensor, a radar sensor, or a LiDAR sensor.

In some embodiments, the apparatus is mounted on a stand.

In some embodiments, the apparatus is part of a label scanning station.

In accordance with some embodiments, an electronic device includes one or more processors, memory, and one or more programs stored in the memory. The programs are configured for execution by the one or more processors. The one or more programs include instructions for performing any of the methods described herein.

In accordance with some embodiments, a non-transitory computer-readable storage medium stores one or more programs configured for execution by an electronic device having one or more processors and memory. The one or more programs include instructions for performing any of the methods described herein.

Thus methods, systems, and devices are disclosed that enable optimal design, execution, and performance of barcode scanners.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

FIGS. 4A and 4B illustrate a graphical user interface that is displayed on a computing device in accordance with some embodiments.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Figure 1:
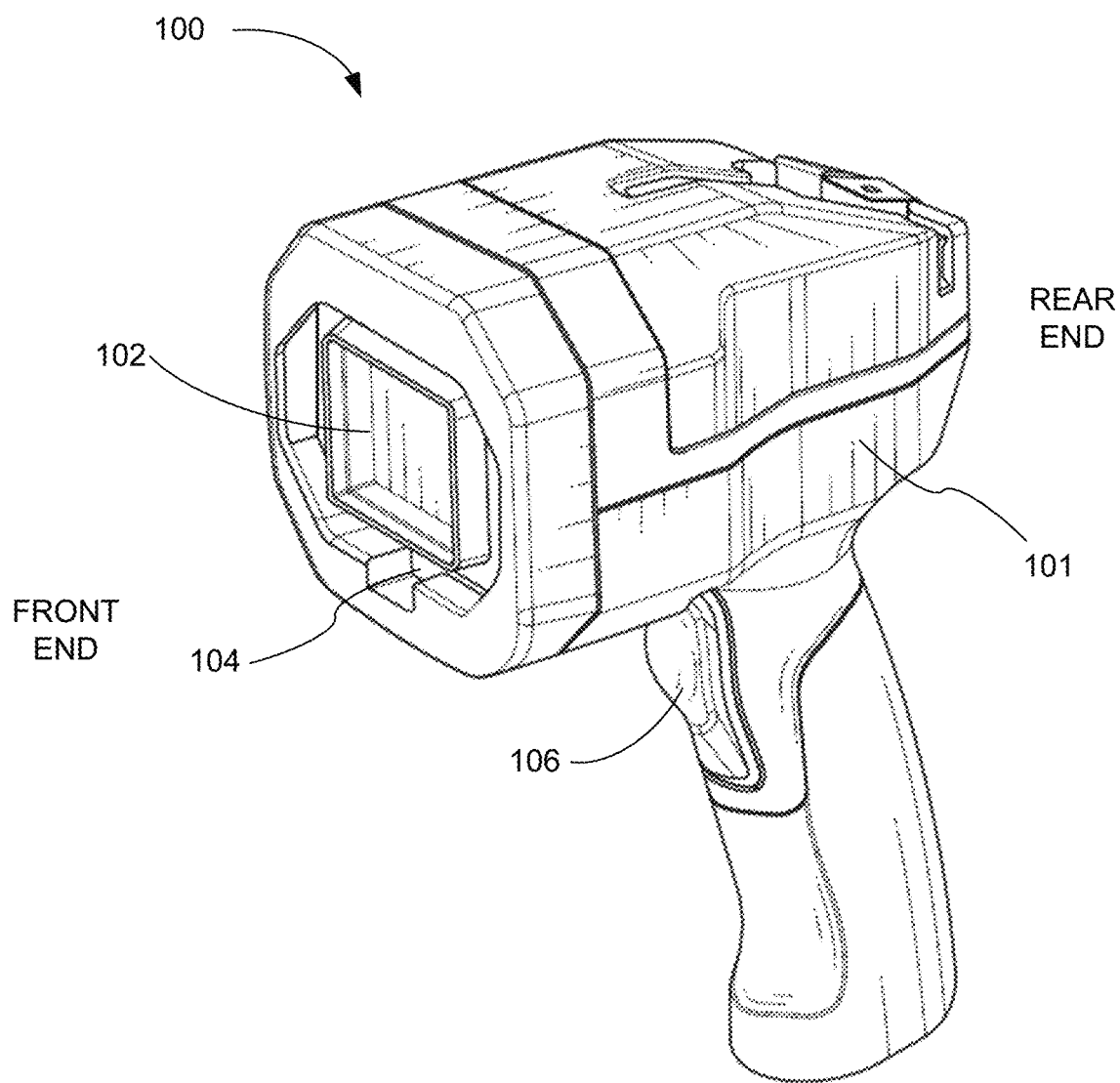
FIG. 1 illustrates a perspective view of an apparatus in accordance with some embodiments.

FIG. 1 illustrates a perspective view of an apparatus 100 (e.g., an electronic device) according to some embodiments.

According to some embodiments of the present disclosure, the apparatus 100 is a scanning device. In some embodiments, the apparatus 100 can also be referred to as a code reader, a barcode scanner, a label scanner, an optical scanner, or an image capture system. In some embodiments, the apparatus 100 is a handheld device. In some embodiments, the apparatus 100 is mounted on a stand. In some embodiments, the apparatus 100 is part of an optical data reading system (e.g., a label scanning station).

FIG. 1 illustrates that the apparatus 100 includes a housing 101 (e.g., a body or an exterior case) for protecting components that are located inside the apparatus 100. In some embodiments, the housing 101 includes integrated fittings or brackets to keep the internal components in place. FIG. 1 also shows that the apparatus 100 includes a cover 102 (e.g., a transparent cover or a partially transparent cover) positioned at a front end of the apparatus 100.

According to some embodiments of the present disclosure, the apparatus 100 includes one or more distance sensors 104 (e.g., internal distance sensors) that are positioned within the apparatus 100. For example, FIG. 1 illustrates a distance sensor 104 positioned inside the apparatus 100 (e.g., adjacent to the cover 102) and faces the front end of the apparatus 100.

In some embodiments, the distance sensor 104 is a time-of-flight (TOF) sensor. A TOF sensor measures the elapsed time from the emission of a signal (e.g., a wave pulse, an LED pulse, a laser pulse, or IR waves) from the sensor to the moment it returns to the sensor after reflecting off an object. Distance is then calculated by using the speed of light in air and the time between sending/receiving the signal.

In some embodiments, the distance sensor 104 is an ultrasonic sensor. An ultrasonic sensor, or a Sonar sensor, detects the distance to an object by emitting high-frequency sound waves. The ultrasonic sensor emits high-frequency sound waves towards a target object, and a timer is started. The target object reflects the sound waves back towards the sensor. A receiver picks up the reflected wave and stops the timer. The time taken for the wave's return is calculated against the speed of sound to determine the distance travelled.

In some embodiments, the distance sensor 104 is a radar sensor. The radar sensor (e.g., radar distance sensor) transmits high frequency radio waves (e.g., microwaves) and calculates the distance to an object by measuring the reflection of the radio waves from the object.

In some embodiments, the distance sensor 104 is a LiDAR sensor, which measures the range of a target object through light waves from a laser (e.g., instead of radio or sound waves).

In some embodiments, the distance sensor 104 is an infrared (IR) distance sensor. An IR distance sensor works through the principle of triangulation, measuring distance based on the angle of the reflected beam.

In some embodiments, the apparatus 100 includes two or more distance sensors 104, each having the same type (e.g., each of the two or more distance sensors is a TOF sensor). In some embodiments, the apparatus 100 includes two or more distance sensors that are of distinct types (e.g., the apparatus 100 includes a TOF distance sensor and a radar sensor).

FIG. 1 illustrates that the apparatus 100 includes a button 106 (e.g., a trigger) for activating the apparatus 100 (e.g., activating one or more light sources 110 to start a read cycle).

Figure 2:
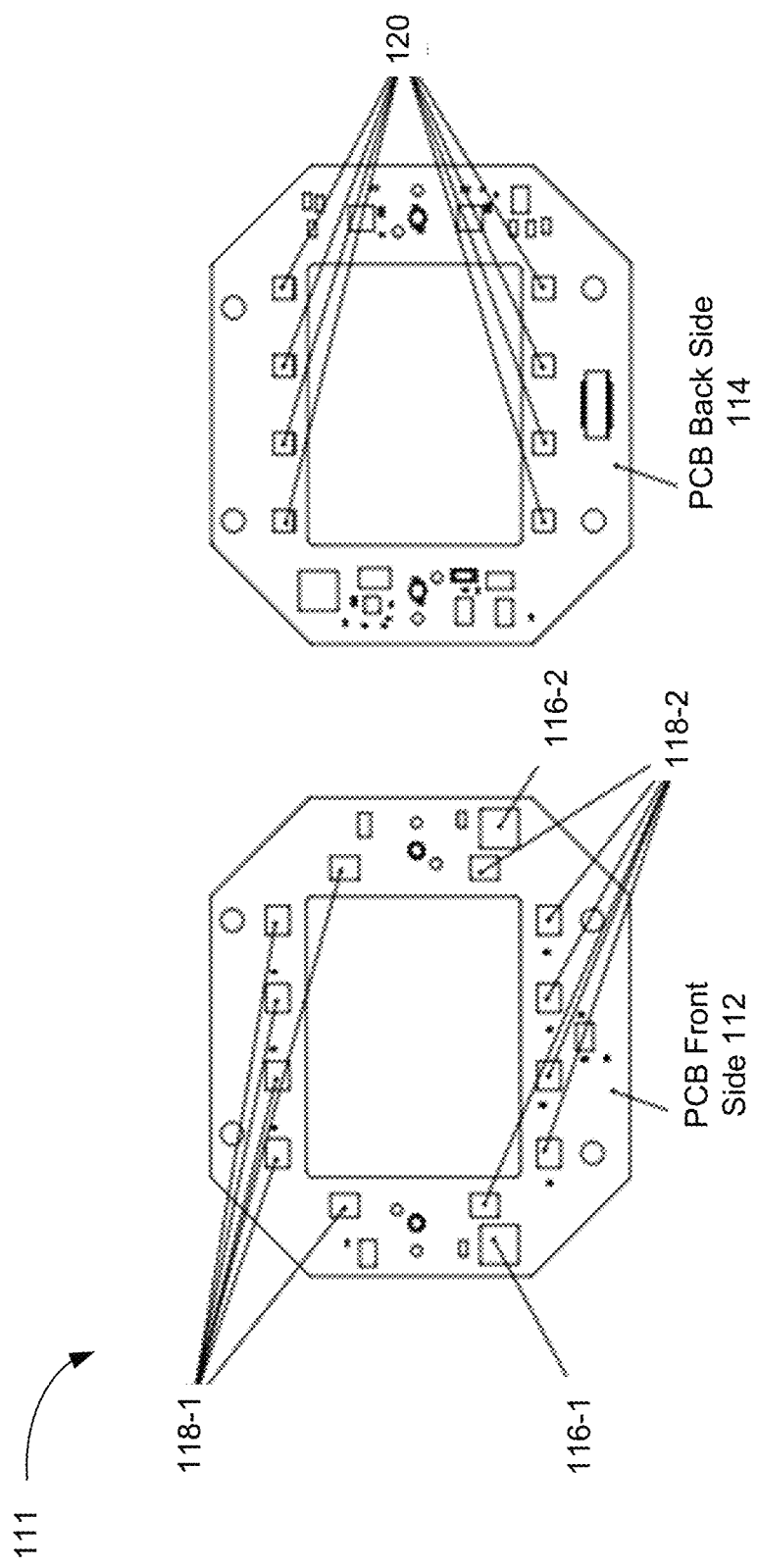
FIG. 2 illustrates light sources of an apparatus according to some embodiments.

FIG. 2 illustrates light sources (e.g., lighting sources, illumination sources, or illuminators) of an apparatus 100 according to some embodiments.

In some embodiments, the light sources 110 are part of an illumination system of the apparatus 100, which also includes illuminators such as bright field and dark field illuminators, a reflector, and a lighting module. Details of the bright field and dark field illuminators, reflector, and the lighting module are described in U.S. patent application Ser. No. 14/298,659, filed Jun. 6, 2014, entitled "Combination Dark Field and Bright Field Illuminator," now U.S. Pat. No. 8,989,569, issued on Mar. 24, 2015, which is incorporated by reference herein in its entirety.

In some embodiments, the light sources 110 have one or more lighting types, such as an LED light source, a laser light source, or an LCD light. Each of the lighting types has its respective lighting characteristics, such as color (e.g., blue, red, or green) and/or intensity.

In some embodiments, as illustrated in FIG. 2, the light sources 110 are mounted on (e.g., soldered on) a printed circuit board (e.g., a PCB) 111 that is positioned within the apparatus 100 (e.g., behind the cover 102). The PCB 111 includes a front side 112 facing the front end of the apparatus 100, and a back side 114 facing the back end of the apparatus 100. FIG. 2 illustrates that the PCB front side 112 includes long range light sources 116 (e.g., 116-1 and 116-2) and low angle light sources 118 (e.g., 118-1 and 118-2). The PCB back side 114 includes dome light sources 120.

In some embodiments, the long range light sources 116 are used for illuminating a far field distance range (e.g., determined using the distance sensor 104). In some embodiments, the far field distance range includes distances such as 50 mm, 60 mm, 50 mm to 300 mm, or 60 mm to 250 mm.

FIG. 2 illustrates that the long range light sources include a first long range light source 116-1 positioned on the left and a second long range light source 116-2 positioned on the right of the PCB front side 112. In some embodiments, the first long range light source 116-1 and the second long range light source 116-2 comprise the same lighting type (e.g., both are LED lights having the same color, intensity, and/or lighting characteristics). In some embodiments, the first long range light source 116-1 and the second long range light source 116-2 comprise different lighting types, each having its own color and/or intensity (e.g., the first long range light source 116-1 is a blue LED and the second long range light source 116-2 is a red LED, or the first long range light source 116-1 is an LED light and the second long range light source 116-2 is an LCD light).

In some embodiments, the lighting characteristics of the first long range light source 116-1 and the second long range light source 116-2 can be adjusted independently (e.g., via the application 230). In some embodiments, the first long range light source 116-1 and the second long range light source 116-2 have intensities that are predetermined (e.g., fixed, and cannot be adjusted) (e.g., predetermined by hardware or user specification). In some embodiments, the first long range light source 116-1 and the second long range light source 116-2 are activated or deactivated (e.g., turned on or off) together.

In some embodiments, the light sources 110 include low angle light sources 118. FIG. 2 illustrates that the low angle light sources 118 include low angle north light sources 118-1 that are positioned on the top half of the PCB front side 112 and low angle south light sources 118-2 that are positioned on the bottom half of the PCB front side 112. The low angle light sources 118 are also known as dark field illuminators. Details of dark field illumination are described in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

The low angle light sources 118 illuminate light at relatively low angles of incidence (e.g., 10 degrees, 15 degrees, or 30 degrees) and most of the reflected light is not reflected back into the camera 211. However, the scattered light off of any individual surface detail that does happen to reflect into the camera produces feature-specific contrast. In some implementations, the low angle light sources 118 can be used to effectively inspect a mirrored reflective surface for defects, or read/verify a barcode beneath a specular reflective surface such as a plastic cover that is otherwise unreadable using standard bright field lighting.

FIG. 2 illustrates that in some embodiments, the light sources 110 include dome light sources 120 that are mounted on the PCB back side 120. In some embodiments, the apparatus 100 includes a curved reflector having a curved reflecting surface. Incident light from the dome light sources 120 is directed toward the curved reflector of the apparatus 100, and the light reflected from the reflector is used to illuminate a target object. Details of the reflector are described in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

In an exemplary embodiment, the long range light source 116 has two LEDs, one corresponding to the first long range light source 116-1 and the other corresponding to the second long range light source 116-2. Both the first and second long range light sources are activated or deactivated simultaneously.

In some embodiments, the low angle north light sources 118-1 include a plurality of LEDs (e.g., four, six, or eight), all of which are activated or deactivated simultaneously.

In some embodiments, the low angle south light sources 118-2 include a plurality of LEDs (e.g., four, six, or eight), all of which are activated or deactivated simultaneously.

In some embodiments, the dome light sources 120 include a plurality of LEDs (e.g., six, eight, or ten), all of which are activated or deactivated simultaneously.

Figure 3:
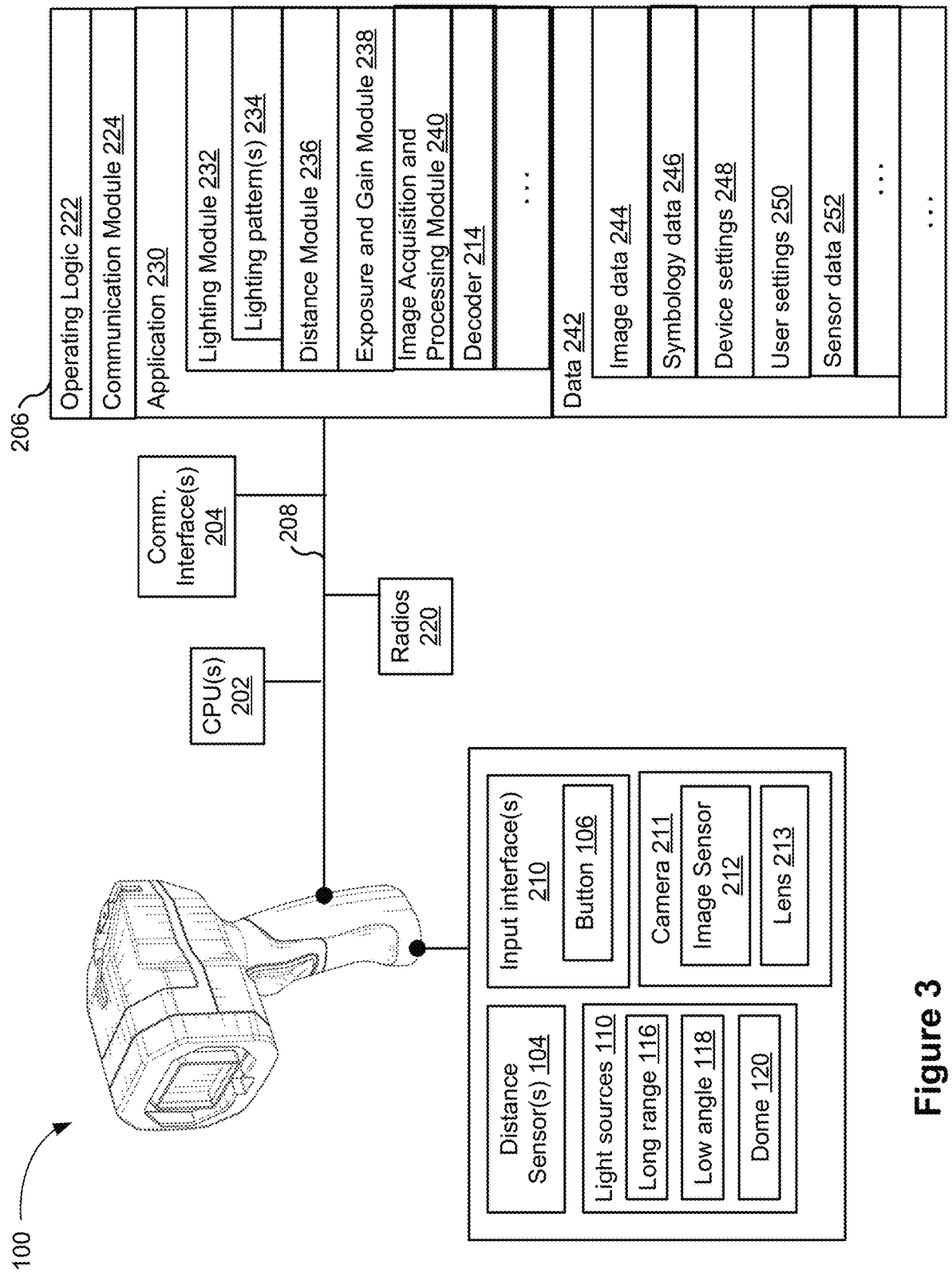
FIG. 3 illustrates a block diagram of an apparatus according to some embodiments.

FIG. 3 shows a block diagram of an apparatus 100 according to some embodiments.

The apparatus 100 includes one or more distance sensors 104, as described previously with respect to FIG. 1. In some embodiments, the one or more distance sensors include one or more of: a time-of-flight sensor, an ultrasonic sensor, a radar sensor, or a LiDAR sensor.

In some embodiments, the apparatus 100 includes one or more proximity sensors for sensing (e.g., detecting) if an object is within the sensing area where the proximity sensor is designed to operate.

In some embodiments, the apparatus 100 uses distance measuring techniques, such as an image focus finder, analog-to-digital conversion (ADC), and/or digital-to-analog conversion (DAC), to determine the distance between a target object and the apparatus 100.

The apparatus 100 includes light sources 110. In some embodiments, the light sources 110 include a long range light source 116, a low angle light source 118, and/or a dome light source 120, as described in FIG. 2 and in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

Figure 4A:
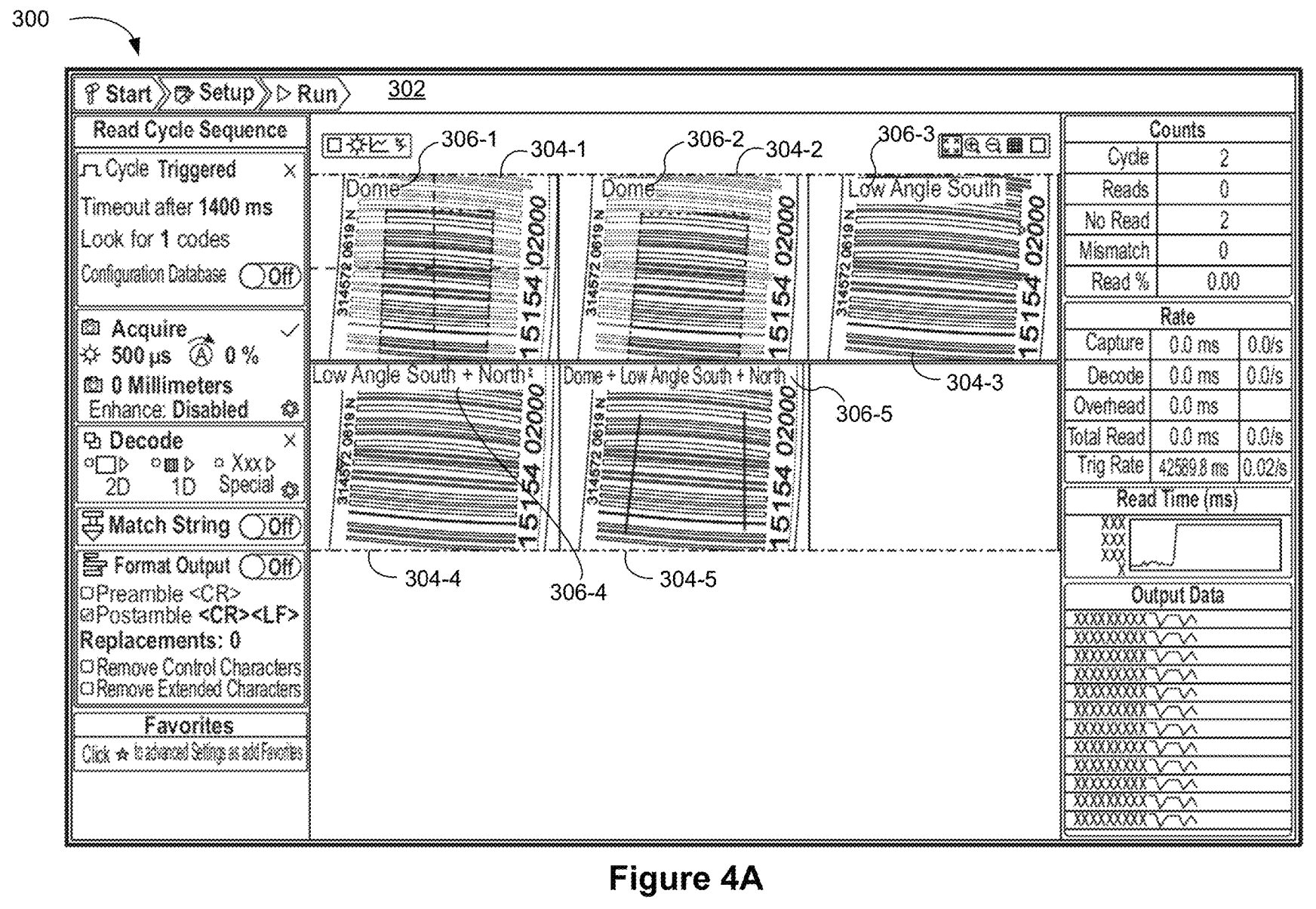
Figure 4B:
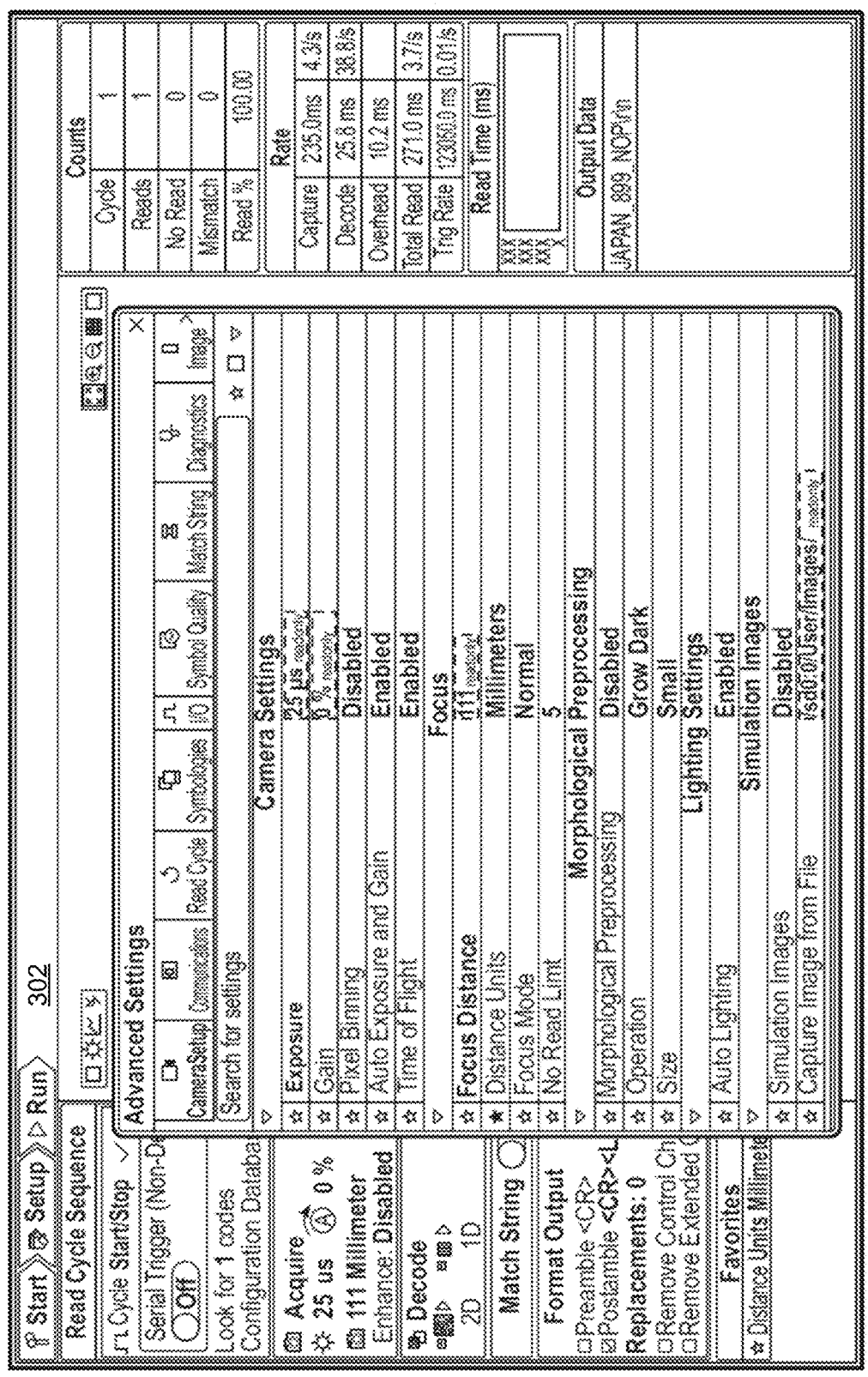

In some embodiments, the apparatus 100 includes a decoder 214 for decoding data contained in a barcode and sending the data to a computer device (e.g., the computing device 300 in FIGS. 4A and 4B). In some embodiments, the decoder 214 is part of a software application (e.g., application 230, FIG. 3). Details of the decoder 214 are described in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

In some embodiments, the apparatus 100 includes one or more input interfaces 210 for facilitating user input, such as the button 106 in FIG. 1. In some embodiments, the apparatus 100 is a battery-operated device and includes a rechargeable battery. In this instance, the input interface 216 can include a charging port for charging the battery.

In some embodiments, the apparatus 100 includes a camera 211, which includes an image sensor 212 and a lens 213. The lens 213 directs the path of light rays and concentrates them onto the image sensor 212, to re-create the image as accurately as possible on the image sensor. The image sensor 212 converts light (e.g., photons) into electrical signals that can be interpreted by the apparatus 100. In some embodiments, the lens 213 is an optical lens and is made from glass or other transparent material. In some embodiments, the lens 213 is a liquid lens that is composed of an optical liquid material, and whose shape, focal length, and/or working distance varies when a current or voltage is applied to the liquid lens. In some embodiments, the apparatus 100 (e.g., via the processor(s) 202) uses distance information obtained by the distance sensor 104, to determine the optimal current or voltage to apply to the liquid lens 213 so as to have the optimal focal length for decoding the barcode data contained in an image.

In some embodiments, the camera 211 is configured to capture images in color. In some embodiments, the camera 211 is configured to capture images in black and white.

The apparatus 100 also includes one or more processors (e.g., CPU(s)) 202, one or more communication interface(s) 204 (e.g., network interface(s)), memory 206, and one or more communication buses 208 for interconnecting these components (sometimes called a chipset).

In some embodiments, the apparatus 100 includes radios 220. The radios 220 enable one or more communication networks, and allow the apparatus 100 to communicate with other devices, such as a computer device (e.g., the computing device 300 in FIGS. 4A and 4B) or a server. In some implementations, the radios 220 are capable of data communication using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Ultrawide Band (UWB), and/or software defined radio (SDR)) custom or standard wired protocols (e.g., Ethernet or HomePlug), and/or any other suitable communication protocol, including communication protocols not yet developed as of the filing date of this patent application.

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processor(s) 202. The memory 206, or alternatively the non-volatile memory within the memory 206, includes a non-transitory computer-readable storage medium. In some embodiments, the memory 206, or the non-transitory computer-readable storage medium of the memory 206, stores the following programs, modules, and data structures, or a subset or superset thereof:

operating logic 222, including procedures for handling various basic system services and for performing hardware dependent tasks;

a communication module 224 (e.g., a radio communication module), which connects to and communicates with other network devices (e.g., a local network, such as a router that provides Internet connectivity, networked storage devices, network routing devices, server systems, computing devices 300, and/or other connected devices) coupled to one or more communication networks via the communication interface(s) 204 (e.g., wired or wireless);

an application 230, which acquires images that contain labels (e.g., barcodes) and decodes the labels, and controls one or more components of the apparatus 100 and/or other connected devices in accordance with a determined state of the eye. In some embodiments, the application 230 includes:

a lighting module 232, which selects and deploys (e.g., based on distance measurements, such as direct measurements from the distance sensor(s) 104 or indirect measurements) one or more light sources 110 and/or sequences of lighting patterns 234 for a current read cycle. In some embodiments, the distance sensor 104 is monitored by the lighting module 232. When the user commences a current read cycle, the distance sensor 104 identifies a distance field (e.g., near field, medium field, or far field) corresponding to the location of the target object. The lighting module 232 selects a lighting sequence, corresponding to the distance field, for execution. If a good read was achieved in the previous read cycle (e.g., the third lighting pattern of the near field lighting sequence), and the current read cycle has the same distance field as the previous read cycle, the application 230 will commence the current read cycle by using values of the earlier good read (e.g., the third lighting pattern of the near field lighting pattern, the previous focus position, the exposure, and/or gain), before starting the lighting sequence from the beginning. The idea here is that users are typically reading many similar parts, and the apparatus can achieve a good read sooner if it starts with known good settings from the last decode. If no previous settings lead to a good read, then the lighting sequence for the current distance field starts at the beginning and iterates through each sequence capture-after-capture;

a distance module 236, which determines (e.g., selects) which sequence of focus distance to be employed during a current read cycle, based on distance measurements from the distance sensor(s) 104;

an exposure and gain module 238, which samples images 244 captured by the camera 211. In some embodiments, the exposure and gain module 238 rejects images that do not fall within predefined attribute ranges for "brightness" and/or "sharpness" (e.g., the rejected images are not processed by the image acquisition and processing module 240). In some embodiments, the exposure and gain module 238 updates image acquisition settings (such as exposure and gain) for the next coming image capture in order to provide the optimal "brightness" for image processing;

an image acquisition and processing module 240, which acquires and processes images; and a decoder 214 for decoding data contained in a barcode and sending the data to a computer device (e.g., the computing device 300 in FIGS. 4A and 4B);

data 242 for the apparatus 100, including but not limited to:

image data 244 (e.g., camera data);

symbology data 246 (e.g., types of codes, such as bar codes);

device settings 248 for the apparatus 100, such as default options, image acquisition settings (e.g., exposure and gain settings), and preferred user settings; and user settings 250, such as a preferred level of humidity, and/or a preferred shade for the lenses 108 (e.g., photochromic lenses); and sensor data 252 that is acquired (e.g., measured) from the distance sensor(s) 104 and/or other sensors that may be included in the apparatus 100.

In some embodiments, after an image is captured (e.g., using the camera 211), the apparatus 100 (e.g., via the application 230) evaluates the quality of an acquired image. For example, the apparatus 100 reads (e.g., determines) a sharpness value, an average light mean value, and/or an average dark mean value of the image, to determine whether to qualify or reject the image. If the results do not meet or exceed predefined target values, the image is rejected and another image is recaptured. If the results meet or exceed the predefined target values, the image processed (e.g., by the image acquisition and processing module 240).

As an example, in some embodiments, a good quality image is an image sample that has a light mean score between 100-170 (out of the range of 0 to 255), a dark mean score between 20-80 (out of the range of 0 to 255), and a sharpness score above 6000 (out of the range from 0 to about 12,000).

In some embodiments, data collected during the image sampling (e.g., evaluation) is captured and added (e.g., as data 242).

In some embodiments, after qualifying the image, the apparatus 100 (e.g., via the application 230) determines whether to adjust an exposure or gain setting (e.g., using a light mean correction path or a dark mean correction path) for the next image. Should it decide to do so, the apparatus 100 gathers the target light mean and dark mean values for comparison, deploys a Proportional and Integral (PI) Controller transfer function, and computes necessary changes to exposure in order to obtain an ideal exposure in the next image.

In some embodiments, upon successful decode of an image, the exposure, gain, and focus values are fed back to the application 230. On the following read cycle, the application 230 checks if these decode settings are pending. If they are, the apparatus 100 attempts to load camera settings and any previous settings, as opposed to calculating the next configuration of settings. Should the previous decode settings be used, the application 230 samples the image for data but does not adjust the feedback controller's values.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above. In some embodiments, a subset of the programs, modules, and/or data stored in the memory 206 are stored on and/or executed by a server system, and/or by an external device (e.g., computing device 300).

FIGS. 4A and 4B show a graphical user interface 302 that is displayed on a computing device 300 in accordance with some embodiments. The computing device 300 is communicatively connected to the apparatus 100. The computing device 300 can be a tablet, a mobile phone, a laptop, a display assistant device, or any electronic device that includes a display screen. The graphical user interface 302 is part of an application program that executes on the computing device 300. FIG. 4A illustrates that in some embodiments, the graphical user interface 302 displays images 304 (e.g., images 304-1 to 304-5) of barcodes acquired (e.g., decoded) by the apparatus 100. In some embodiments, the images 304 include respective indications 306 (e.g., indications 306-1 to 306-5) of one or more light sources 110 that are used (e.g., activated) by the apparatus 100 to acquire the images 304. FIG. 4B illustrates that in some embodiments, the graphical user interface 302 is used for setting up read cycles and for modifying settings such as camera settings and lighting settings. The settings (e.g., user inputs) are then transmitted from the computing device 300 to the apparatus 100 for execution by the apparatus 100. In some embodiments, the apparatus 100 is preloaded with factory parameters and configuration settings. A user can modify the settings via the graphical user interface 302.

Separate Lighting Pattern Sequences Based on Target Distance

One of the challenges of decoding part markings is that they require very specific scanner settings (e.g., exposure and/or gain settings) to successfully illuminate the marking and acquire an image that includes the marking. Modern scanning devices are equipped with different light sources and/or illuminators, which can assist with emphasizing features up close. However, even when equipped with the different light sources, the scanning devices tend to perform well only for "at contact" reading (e.g., where the part is located immediately adjacent to the scanner). Their performance deteriorates when the distance between the object and the device increases.

Some aspects of the present disclosure provide a technical solution to the technical problem by providing a scanning device 100 that includes one or more distance sensors 104 for determining the distance between the apparatus and a target object. Depending on the measured distance, the scanning device projects (e.g., activates or selects), automatically and without user intervention, a respective lighting pattern sequence that is designed for the specific distance range to the target object.

In some embodiments, a lighting pattern sequence includes one or more lighting patterns that are arranged according to a predetermined order. In some embodiments, the predetermined order is based on the probability (e.g., a decreasing probability) that a successful read will be obtained.

In one usage scenario, when the scanning device determines that the distance between the device and the target object corresponds to "at contact" reading (e.g., near field), the device avoids using (e.g., it will not activate) light sources that are designed for "at distance" reading (e.g., far field). The device activates a "at contact" lighting sequence of lighting patterns, starting with the lighting pattern with the highest probability of obtaining a successful read. Should this not lead to a successful extraction of image data, the next most probable lighting pattern is attempted. This continues until all lighting patterns of the "at contact" lighting sequence of lighting patterns has been attempted (e.g., in descending probability order). In some embodiments, after attempting the "at contact" lighting sequence once, the scanning device repeats the same lighting sequence. In some embodiments, after attempting the lighting sequence once, the scanning device measures (e.g., using the distance sensor) the distance between the device and the target object and selects a sequence of lighting patterns corresponding to the measured distance.

In some embodiments, if the device obtained a good read in a previous read cycle, and the device determines that the current read cycle has the same distance field as the previous read cycle, the device starts with the lighting pattern that was used to obtain the good read. As an example, in a previous read cycle corresponding to an "at contact" distance, the device obtained a good read using lighting pattern B of the "at contact" lighting sequence, which includes lighting patterns in the order: lighting pattern A, lighting pattern B, and lighting pattern C. If the device determines that the current read cycle is also "at contact," the device starts with lighting pattern B. The idea here is that users are likely reading many similar parts, and the apparatus can achieve a good read sooner if it starts with known good settings from the last decode.

Activating separate lighting pattern sequences based on target distance has several advantages. First, by automatically selecting the lighting pattern sequence that is optimized for a specific distance range, the scanning device can produce more "good reads", which leads to higher productivity and greater user satisfaction. Second, by starting with a lighting pattern that was used to obtain a good read in the previous read cycle, the likelihood of achieving a good read is improved. This also leads to higher productivity and improved user satisfaction. Third, because the sequence of lighting patterns is predetermined for a distance field, a user can avoid selecting lighting patterns that are not optimized for the current measured distance. This saves time and improves user satisfaction.

Figure 5:
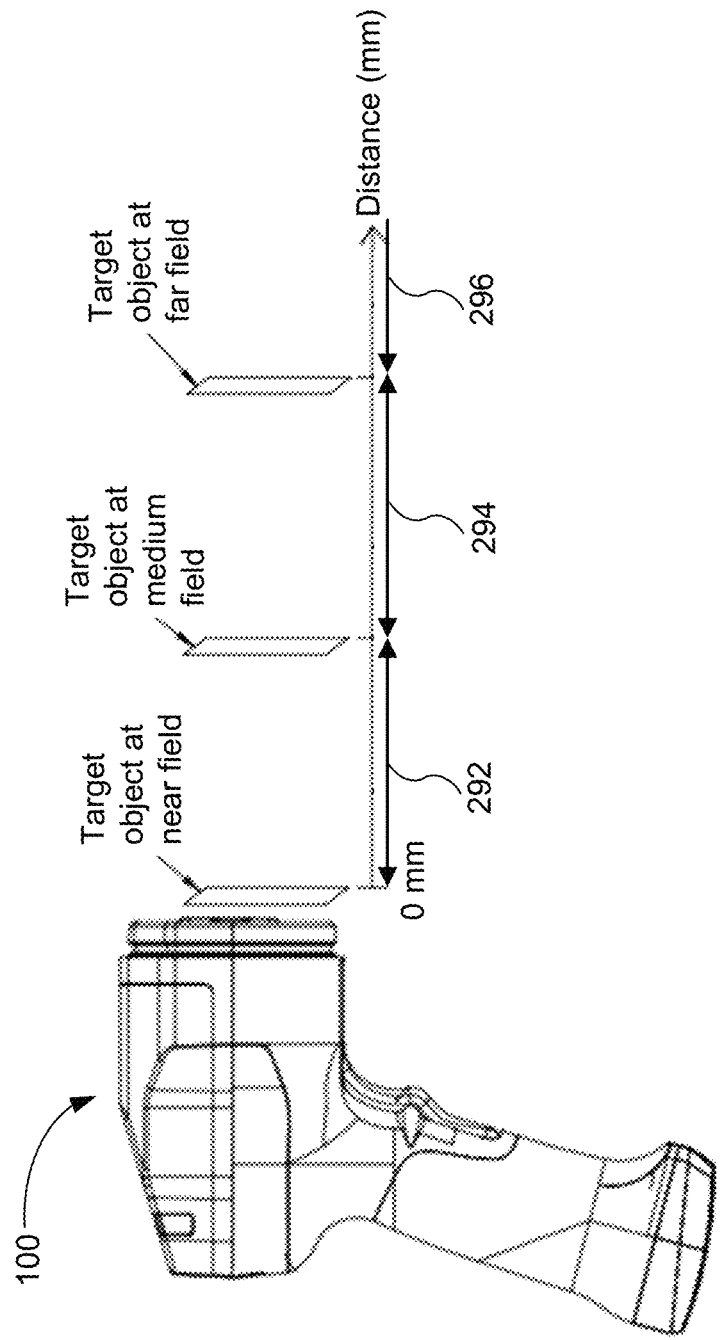
FIG. 5 illustrates distance fields and distance ranges of an apparatus according to some embodiments.

FIG. 5 illustrates distance fields and distance ranges of an apparatus 100 according to some embodiments.

In some embodiments, the apparatus 100 is configured to operate at a plurality of distance fields. A distance field corresponds to a respective distance range (e.g., working distance range). FIG. 5 illustrates that in some embodiments, the apparatus 100 is configured to operate at a near field, corresponding to a near field distance range 292. Typical ranges for the near field are 0 to 10 mm, 0 to 20 mm, or 0 to 25 mm.

FIG. 5 illustrates that in some embodiments, the apparatus 100 is configured to operate at a medium field, corresponding to a medium field distance range 294. Typical ranges for the medium field are 10 mm to 40 mm, 20 mm to 50 mm, or 20 mm to 60 mm.

FIG. 5 also illustrates that in some embodiments, the apparatus 100 is configured to operate at a far field, corresponding to a far field distance range 296. Typical ranges for the far field distance are 50 mm to 300 mm, >60 mm, or 60 mm to 250 mm.

In some embodiments, the camera 211 has one or more predetermined focus positions corresponding to a distance field. For example, in some embodiments, the near field corresponds to camera focus positions of 0 mm, 5 mm, 10 mm, 15 mm, and/or 20 mm. In some embodiments, the medium field corresponds to camera focus positions of 40 mm, 50 mm, and/or 15 mm greater than the distance measured by distance sensor.

Although FIG. 5 illustrates three distance fields, it will be apparent to one of ordinary skill in the art that the apparatus 100 can include any number of distance fields (e.g., two, three, five, or six), each corresponding to a respective distance range.

In some embodiments, the distance fields and their corresponding distance ranges can be modified based on camera specification and/or user specification.

According to some embodiments of the present disclosure, when image capture settings are prepared for the coming image capture, the apparatus 100 utilizes a distance sensor 104 to measure the distance between the apparatus 100 and a target object. In some embodiments, the apparatus 100 correlates (e.g., maps or compares) the measured distance against a plurality of predefined distance fields and/or distance ranges, and identifies a distance field and/or distance range to which the measured distance corresponds.

In some embodiments, a distance field (e.g., distance range) has a respective (e.g., unique or distinct) lighting pattern sequence (e.g., the lighting patterns 234).

In some embodiments, at "near field," the apparatus 100 executes a near field lighting pattern sequence having lighting patterns, such as (i) Dome (e.g., dome light source 120)—Red (color), (ii) Dome—Blue, (iii) Low Angle (South Only) (e.g., low angle south light source 118-2), (iv) Low Angle (Both North and South) (e.g., low angle north light source 118-1 and low angle south light source 118-2), and (v) Low angle (both north and south) combined with Dome Red (e.g., low angle north light source 118-1, low angle south light source 118-2, and dome light source having red color).

In some embodiments, at "medium field," the apparatus 100 executes a medium field lighting pattern sequence having lighting patterns, such as (i) Low Angle (South Only), (ii) Low Angle (Both North and South), and (iii) Long Range.

In some embodiments, at "far field," the apparatus 100 executes a far field lighting pattern sequence having lighting pattern: Long range only (e.g., long range light source 116).

In some embodiments, the order of the lighting patterns within a lighting sequence is intrinsically ranked from most likely to decode an image to least likely.

In some embodiments, for a lighting pattern, the average time for acquiring an image is about 35 milliseconds and the average time for processing an image is about 100 milliseconds. Therefore, the average time to iterate through the near field lighting pattern sequence with 5 lighting patterns is approximately 675 milliseconds.

In some embodiments, the dome light sources 120 and low angle light sources 118 (e.g., the low angle north light sources 118-1 and the low angle south light sources 118-2) are activated simultaneously (e.g., by the processors 202) to read extremely large codes that might be on rounded surfaces. The combination of the dome light sources 120 and low angle light sources 118 produces a more uniform illumination across the entire image and increases the likelihood of obtaining a successful read. This leads to better user satisfaction because a user does not have to align a code perfectly within the lighting footprint to be able to obtain a successful read.

Symbology or Frame Rate Changes Based on Target Distance

Some aspects of the present disclosure are directed to a scanning device (e.g., apparatus 100) that is used for reading and decoding data contained in barcodes. A barcode is associated with a respective symbology type (e.g., barcode types or barcode symbology types). Examples of symbology types include Code 39 (linear barcode), Code 128 (e.g., supporting both alpha and numeric characters), UPC (Universal Product Code), DotCode (aka Dot-Peen), Data Matrix, and Direct Part Marking (DPM)/Automotive. DPMs used in the automotive industry tend to be directly milled, punched, or etched onto parts that are of different sizes and surfaces.

Every symbology type that is enabled in the apparatus 100 uses a finite amount of processing time (e.g., by increasing the amount of data the processor 202 needs to identify and/or match before arriving at a decode).

Practically speaking, symbology types can be correlated with the distance between the scanning device and a target object. This is because the camera's ability to resolve image details and elements within the label imposes a physical limit as to how far away from the target object the scanning device can operate. Beyond this physical limit, it makes sense to disable symbologies that are typically sized to be smaller. For example, a Micro QR code, which is a symbology type that can be under one square centimeter in area, is not typically selected as the label symbology printed on the side of a pallet of goods, but would be ideal for small electronics or electronic components. Therefore, when the scanning device is operating at long range distances, the MicroQR code type can be disabled to increase the overall performance of the code reader (e.g., by reducing data processing and avoiding nonsensical code types).

According to some embodiments, a scanning device 100 includes one or more distance sensors. The device measures the distance between a target object and the device, and determines that the measured distance corresponds to a (e.g., predefined) distance field and/or distance range. The device identifies (e.g., automatically and without user intervention), from a plurality of predefined symbology types (e.g., the symbology data 246), a subset of symbology types corresponding to the determined distance field and/or distance range. The device acquires an image of the object and decodes the image using the subset of symbology types.

In some embodiments, reducing symbology types based on distance has the benefit of reducing processing times, thereby resulting in a faster and higher performing device.

According to some aspects of the present disclosure, a scanning device 100 is configured to vary the image acquisition rate (e.g., the frame rate) based on the distance between the device and a target object. In some embodiments, the device increases the image acquisition rate when the distance between the device and the target object increases (e.g., the target object is further from the device). In some embodiments, the device reduces an image acquisition rate when the distance between the device and a target object decreases (e.g., when the target object is closer to the device).

For example, when the device acquires an image at long distance (e.g., 100 mm or more), the area of the image that is occupied by the symbol is typically small (e.g., less than 50%) compared to that of an image that is acquired at shorter distances (e.g., 20 mm or less). There is a limit to the balance of symbol size, distance between the scanning device and target object, and the quantity of data that can be read. When the device is moved further from the target object, the element size of the label is reduced. Because the camera has a fixed resolution, and the element size of the label is reduced at longer distances, it can be challenging for the camera to resolve individual elements of the label at long distances. This relationship guides users to a reduced amount of data when printing very large labels on products. Because it is easier to process and extract image data from images that are acquired at longer distances, the image acquisition rate increases when the distance between the device and a target object increases.

In contrast, during close range reading (e.g., near field), the element sizes can become quite large. For example, the symbol can occupy 90% or more of the image frame. Therefore, the image acquisition rate is likely slower when the device is reading labels up close, to allow the camera sensor sufficient time to resolve smaller elements in dense codes.

Using Distance Sensor Delta to Determine when to Enter Presentation Mode

Some aspects of the present disclosure are directed to a scanning device that measures the distance between the device and an object. The device activates or deactivates a mode of operation (e.g., a continuous reading mode or a presentation mode) based on the measured distance.

Scanning devices can be configured to operate in a continuous capture/read mode and a presentation mode. In the continuous capture/read mode, the device is continuously acquiring images to look for data labels in the images (even though there may not be any object and/or barcode in the device vicinity). Consequently, the continuous capture/read mode generates a lot of heat and consumes unnecessary power. From a user perspective, the continuous capture/read mode can be annoying because light from the image capture system of the device is always flashing, which can be uncomfortable to a user's eyes. By contrast, in the presentation mode, the device is in an idle state until it detects an object in a field of view of the device. The device returns to the idle state after the object leaves the field of view.

According to some embodiments, a scanning device 100 includes an internal distance sensor. The scanning device determines, via the distance sensor, whether there is an object (e.g., a part, a component, or a part marking) in the field of view of the device. For example, in some embodiments, the device measures (e.g., by the distance sensor) a baseline depth. Subsequent to measuring the baseline depth, the device measures (e.g., by the distance sensor) the first depth. The device determines that an object is within the field of view when the first depth is different from the baseline depth (e.g., the difference exceeds a threshold difference). The device activates a read cycle in response to the determination. In some embodiments, subsequent to activating the read cycle, the device measures a second depth. The device detects that the second depth is within a threshold range of the baseline depth. In response to the detection, the device deactivates the read cycle (e.g., the device determines that the object is not in the field of the device).

Accordingly, the device and/or methods disclosed herein advantageously improve the device and its operation. Specifically, by keeping the device in an idle state and activating the read cycle when there is an object within view, the device uses less power and is less prone to overheating. User experience also improves because a user no longer has to deal with continuous flashing lights from the image capture system.

Figure 6A:
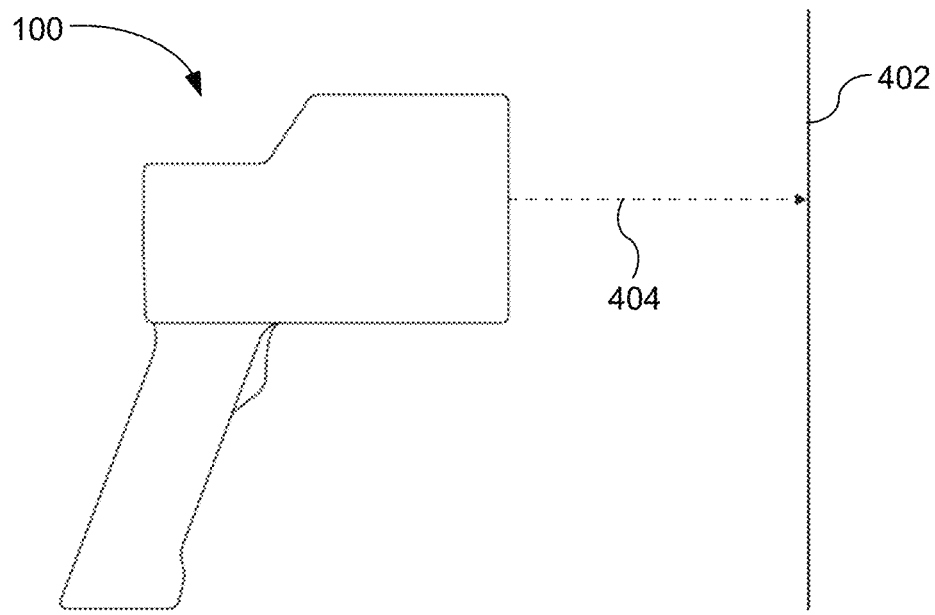
FIGS. 6A and 6B illustrate an exemplary operation of an apparatus according to some embodiments.
Figure 6B:
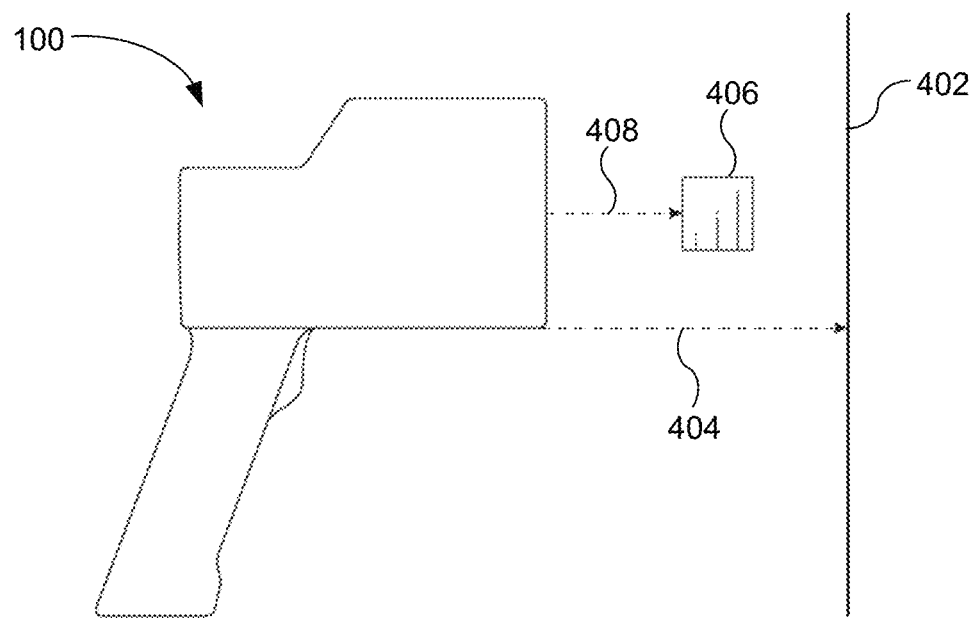

FIGS. 6A and 6B illustrate an exemplary operation of an apparatus 100 according to some embodiments.

FIG. 6A illustrates the apparatus 100 facing (e.g., directed toward) a surface 402. The apparatus 100 is in a (e.g., substantially) stationary position. For example, the apparatus 100 can be held by a user, or secured (e.g., fixed) (e.g., mounted on a stand). The surface 402 can be a fixed surface, such as a table top. FIG. 6A illustrates that there is no object in a field of view of the apparatus 100. In some embodiments, the apparatus 100 is in a "not-reading state" (e.g., a presentation mode). Element 404 represents the distance between the apparatus 100 and the surface 402 (e.g., measured by a distance sensor 104). In some embodiments, the distance 404 is also referred to as a "return to home" distance or a baseline depth.

FIG. 6B illustrates an object 406 within the field of view of the apparatus 100. In some instances, the object 406 comes within the field of view of the apparatus 100 via movement of the object 406 by a user. In some instances, the object 406 comes within the field of view of the apparatus 100 via movement of the apparatus 100.

In some embodiments, the apparatus 100 detects, via the distance sensor 104, the distance 408 between the apparatus 100 and the object 406. The apparatus 100 determines that there is a change (e.g., a decrease) in the distance measured (e.g., from the distance 404 to the distance 408).

In some embodiments, the change in the distance represents a "rising edge detected" event. The distance before the object appeared (e.g., distance 404) is recorded as the "return to home" distance or the baseline depth. Should the distance 404 or a predetermined threshold of the distance 404 be detected again (e.g., by the distance sensor 104), the apparatus 100 determines that the object was removed from the field of view and stops reading.

In some embodiments, in response to the change in the distance measured, the apparatus 100 activates a read cycle (e.g., the apparatus 100 enters into a reading state). If the object that appears in the view of the apparatus 100 has a label marking, the label marking is decoded. An "end of read" timer will reset, which allows the label marking to be read again (e.g., repeatedly).

In some embodiments, if no code is read (e.g., detected) at the end of the read cycle, the apparatus 100 stops capturing images and goes back to the not-reading state (e.g., presentation mode). This also avoids the situation where an object is placed in the field of view of the apparatus by accident and triggers the reading state indefinitely.

In some embodiments, when the object 406 is no longer in the field of view of the apparatus 100 (e.g., either the object 406 or the apparatus 100 has been moved), the distance sensor 104 reports the distance 404 (e.g., or a distance that is within a threshold of the distance 404) that was captured in FIG. 6A. When the distance 404 (or a distance that is within the threshold of the distance 404) is reported, the apparatus 100 moves to the "not-reading" state (e.g., presentation mode), in which it stops image capture and image processing. In some embodiments, the removal of the object 406 from the field of view of the apparatus 100 causes a "falling edge" state transition to the not-reading state.

In some embodiments, the apparatus 100 can be held by a user and still be able to transition from the presentation mode to the reading state. For example, the user can hold the apparatus 100 and move the apparatus 100 closer to an object to trigger the "rising edge" or distance reduction that activates the read cycle. Alternatively, the user can hold the apparatus 100 and move the object closer to the apparatus 100 to activate the read cycle.

In some embodiments, there is a tolerance (e.g., 2%, 3%, 2 mm, or 5 mm) applied to the "return to home" distance 404. For example, if the "return to home distance" is 100 mm and the apparatus 100 reads 98 mm or greater, this can be sufficient to stop device activity.

In some embodiments, the apparatus 100 ends the read cycle when the current distance (e.g., measured by the distance sensor 104) is within a predefined proximity to the recorded "return to home" distance (e.g., within 5 mm of the recorded home distance). In some embodiments, the apparatus 100 (e.g., the one or more processors 202) adds 5 mm the current distance when monitoring for the "return to home" distance, because the distance sensor can switch back and forth between two values when the value reported is rounded to an integer format.

In some embodiments, the apparatus 100 ends the read cycle when the distance sensor 104 detects a distance that is greater than the "return to home distance" or greater than the limit of the distance sensor 104.

In some embodiments, instead of (or in addition to) a distance sensor, the apparatus 100 includes an image processing algorithm to detect "rising edge" or "falling edge" events. For example, the apparatus can acquire a baseline image that includes the surface 402, acquire an image that includes the object 408, and use image subtraction techniques to detect "rising edge" or "falling edge" events (e.g., by measuring the difference in distance between the surface 402 and the object 406 from the images).

In some embodiments, "rising edge" or "falling edge" events can be detected via a change in focus of a camera (e.g., the camera 211). For example, the apparatus 100 can detect an object via a change in diopter focus of the camera.

Flowcharts

Figure 7A:
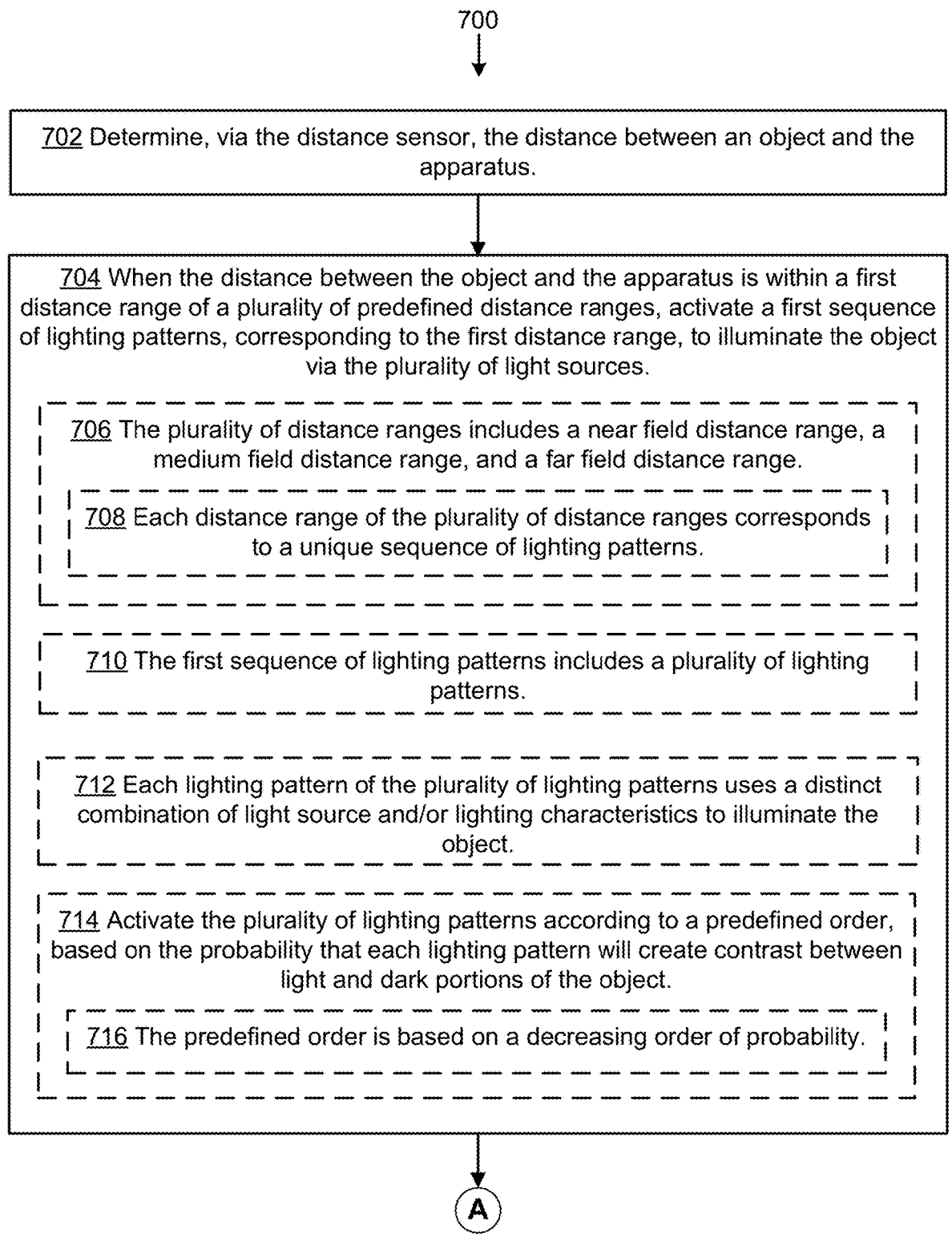
FIGS. 7A and 7B provide a flowchart of a method according to some embodiments.
Figure 7B:
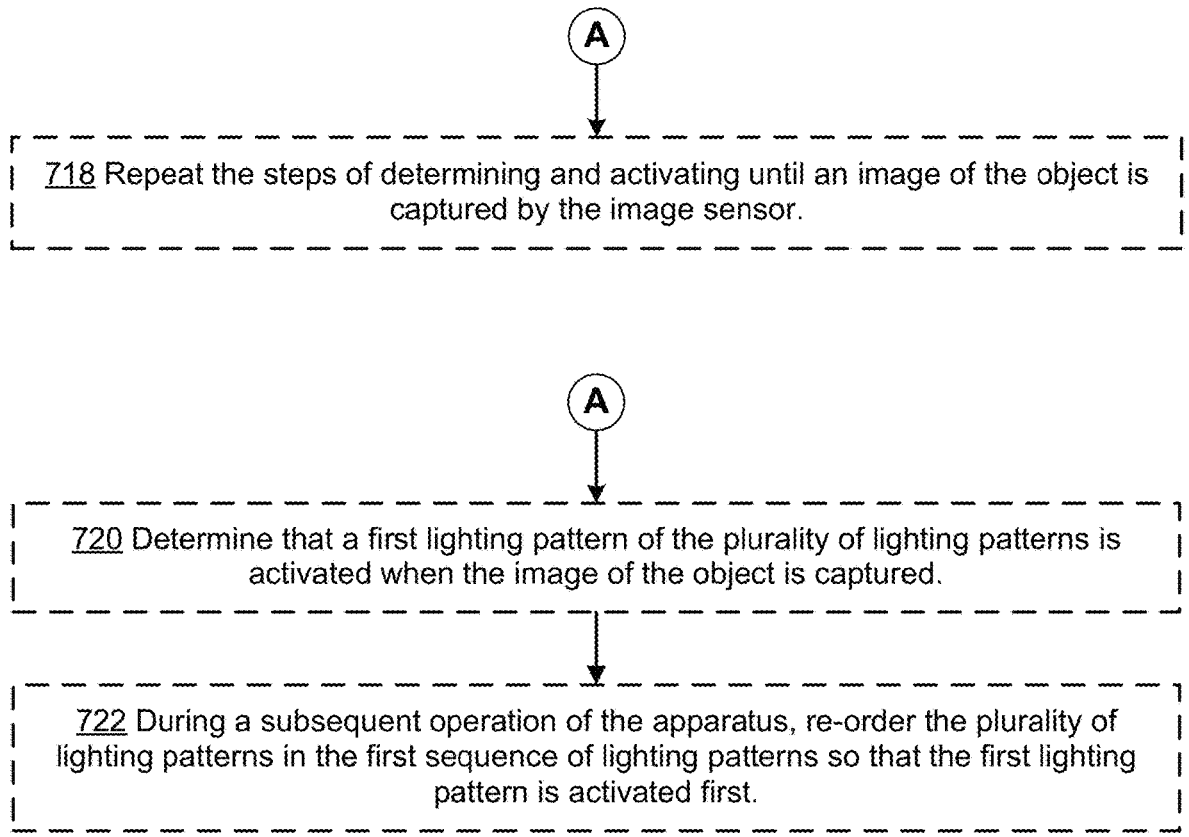

FIGS. 7A and 7B provide a flowchart of a method 700. The method 700 is also called a process. The method 700 is performed by (e.g., performed at or performed using) an apparatus 100 (e.g., an electronic device or a scanner) that has one or more distance sensors 104, a plurality of light sources 110, one or more processors 202 (e.g., processing circuitry) and memory 206. The memory 206 stores one or more programs configured for execution by the one or more processors 202. In some embodiments, the operations shown in FIGS. 1, 2, 3, 4A, 4B, 5, 6A, and 6B correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 700 may be combined and/or the order of some operations may be changed.

In some embodiments, the distance sensor 104 is one of: a time-of-flight (TOF) sensor, an ultrasonic sensor, a radar sensor, or a LiDAR sensor.

In some embodiments, the plurality of light sources 110 includes a long range light source 116, a low angle light source 118 (e.g., a dark field light source), and/or a dome light source 120. In some embodiments, a light source includes one or more respective lighting characteristics, such as color and uniformity of illumination. In some embodiments, the plurality of light sources includes a light source that is an LED with one color (e.g., blue or red). In some embodiments, the plurality of light sources includes a light source that is an LED that combines two or more colors (e.g., blue and red) that can be selectively activated to illuminate an object.

In some embodiments, each of the light sources can be categorized as an interior light source or an exterior light source, as described in U.S. Pat. No. 8,989,569, entitled "Combination Dark Field and Bright Field Illuminator," which is incorporated by reference herein in its entirety. As explained in the '569 patent, the terms "interior" and "exterior" do not refer to where the respective light sources are mounted in or on illuminator, but rather to the general direction in which the light sources emit light. "Interior" light sources emit light generally toward the interior of reflector, while "exterior" light sources emit light in a direction other than toward the interior of reflector.

In some embodiments, the plurality of light sources includes an inward-facing light source (e.g., directed toward an image sensor 212 of the apparatus 110) and an outward-facing light source (e.g., directed away from the image sensor).

In some embodiments, the plurality of light sources includes a first light source having a first color (e.g., red, infrared, blue, or green) and a second light source having a second color that is distinct from the first color.

In some embodiments, the apparatus 100 includes an image sensor 212.

In some embodiments, the apparatus 100 includes a camera 211 having a lens. The camera is used for acquiring one or more images of a target object. In some embodiments, the image sensor is part of the camera.

Referring to FIG. 7A, the apparatus 100 determines (702) (e.g., directly), via the distance sensor 104, the distance between an object (e.g., a label, a barcode, a code) and the apparatus 100 (e.g., the distance sensor). In some embodiments, the object is a part (e.g., a component) that includes a label, a barcode, a code, or a part marking. In some embodiments, the object is any material and/or surface (e.g., a surface that is reflective, dull, smooth, or rough).

In some embodiments, the apparatus 100 determines the distance between the object and the apparatus 100 via direct measurements from the distance sensor 104.

In some embodiments, the apparatus 100 determines the distance between the object and the apparatus 100 via indirect measurements. For example, the apparatus 100 can use distance measuring techniques, such as an image focus finder, analog-to-digital conversion (ADC), and/or digital-to-analog conversion (DAC), to determine a distance between the object and the apparatus 100.

When the distance (e.g., separation) between the object and the apparatus is within a first distance range of a plurality of predefined distance ranges, the apparatus 100 activates (704) (e.g., employs, selects and deploys) (e.g., automatically and without user intervention) a first sequence of lighting patterns, corresponding to (e.g., specific to) the first distance range, to illuminate the object via the plurality of light sources.

In some embodiments, lighting patterns in the first sequence of lighting patterns have a predefined order.

In some embodiments, the first lighting sequence is one of a plurality of lighting sequences. Each lighting sequence of the plurality of lighting sequences corresponds to a respective distance range.

In some embodiments, the plurality of distance ranges includes (706) a near field distance range, a medium field distance range, and a far field distance range. For example, in some embodiments, objects in the near field distance range are located between 0 and 20 mm from the apparatus 100. In some embodiments, objects in the medium field distance range are located approximately between 20 mm and 60 mm from the apparatus 100. In some embodiments, objects in the far field distance range are located more than 60 mm from the apparatus 100 (e.g., 60 mm to 250 mm or 60 mm to 300 mm).

In some embodiments, each distance range of the plurality of distance ranges corresponds (708) to a unique sequence of lighting patterns.

For example, in some embodiments, the near field distance range corresponds to a sequence of lighting patterns: (i) dome light source (red), (ii) dome light source (blue), (iii) low angle light source (south only), (iv) low angle light source (both north and south), and (v) low angle light source (both north and south) combined with dome light source (red). In some embodiments, at the medium field distance range, the sequence of lighting patterns is (i) low angle (south only), (ii) low angle (both north and south), and (iii) long range. In some embodiments, at the far field distance range, the sequence of lighting patterns is long range only.

In some embodiments, the first sequence of lighting patterns includes (710) a plurality of lighting patterns. For example, as described above, the sequence of lighting patterns corresponding to the medium field distance range includes three lighting patterns: (i) low angle (south only), (ii) low angle (both north and south), and (iii) long range.

In some embodiments, each lighting pattern of the lighting patterns uses (712) a distinct combination of light source(s) and/or lighting characteristics (e.g., intensity, uniformity, intensity, and/or angle of illumination). For example, as described above, the sequence of lighting patterns corresponding to the near field distance range includes five lighting patterns (numbered (i) to (v) above). The first lighting pattern (e.g., dome light source (red)) uses the dome light source 120 and a red-colored light (e.g., a red LED). The second lighting pattern (e.g., dome light source (blue)) uses the dome light source 120 and a blue-colored light (e.g., a blue LED).

In some embodiments, the first sequence of lighting patterns includes a lighting pattern that utilizes an external light source (e.g., an ambient light source).

In some embodiments, the lighting characteristics of the light source can be adjusted by a user. For example, a user can vary the intensity and/or angle of illumination of the light source. In some embodiments, the lighting characteristics/settings are predefined by the system and cannot be changed by a user.

With continued reference to FIG. 7A, in some embodiments, the apparatus 100 activates (714) the plurality of lighting patterns according to a predefined order, based on the probability that each lighting pattern will create contrast between light and dark portions of the object (e.g., the respective lighting pattern will cause light to be reflected from the object to an image sensor of the apparatus 100).

In some embodiments, the predefined order is (716) based on a decreasing order of probability.

In some embodiments, the apparatus 100 repeats (718) the steps of determining and activating until an image of the object is captured by the image sensor.

For example, in some embodiments, when the distance between the object and the apparatus 100 is within the first distance range, the apparatus 100 repeatedly cycles through the first sequence of lighting patterns, corresponding to the first distance range, until an image of the object is successfully acquired.

In some embodiments, the apparatus 100 is configured to detect (e.g., determine) the distance between the object and the apparatus (e.g., at time t=0) and activate a lighting pattern corresponding to the detected distance range. At the end of one or a few (e.g., three or five) lighting pattern cycles, the apparatus 100 checks the distance between the apparatus 100 and the object again. When the apparatus determines that the distance between the object and the apparatus is still within the distance range that was previously determined, the apparatus repeats the sequence of lighting patterns corresponding to the previously (and currently) determined distance range. When the apparatus determines that the distance between the object and the apparatus corresponds to a different distance range than was previously determined, the apparatus activates another sequence of lighting patterns, corresponding to the newly determined distance range, to illuminate the object.

In some embodiments, after an operator of the apparatus has been trained to scan an object by holding the apparatus still (instead of moving the apparatus around to try and scan an object), the distance sensor 104 detects the distance once and obtains a first distance range. The apparatus then repeatedly activates the sequence of lighting patterns corresponding to the distance range (e.g., without re-establishing the distance).

In some embodiments, the apparatus 100 determines (720) that a first lighting pattern of the plurality of lighting patterns is activated when the image of the object is captured (e.g., the image of the object is captured by illuminating the object using the first lighting pattern). During a subsequent operation of the apparatus, the apparatus 100 re-orders (722) the plurality of lighting patterns in the first sequence of lighting patterns so that the first lighting pattern is activated first.

Figure 8A:
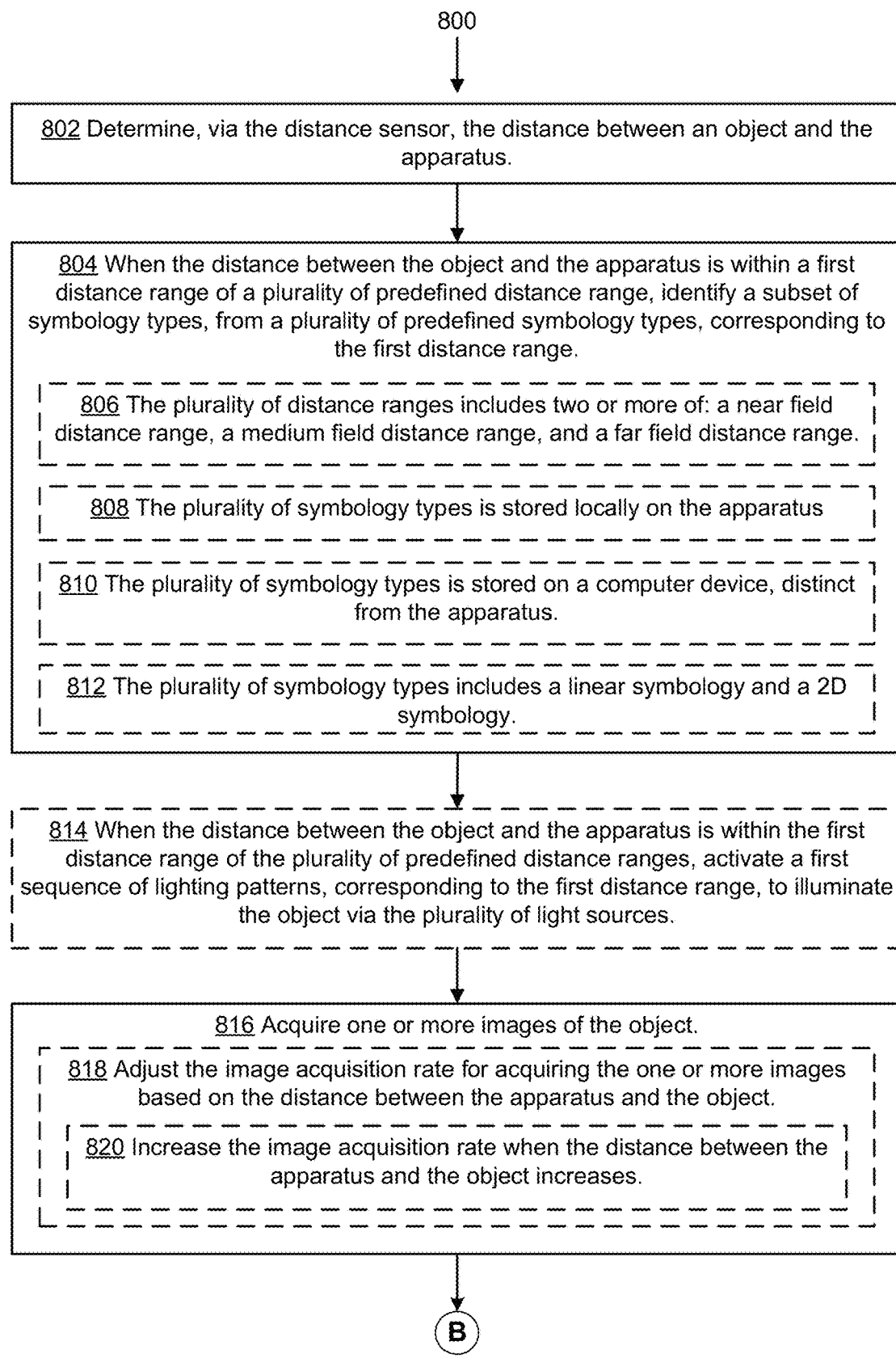
FIGS. 8A and 8B provide a flowchart of a method according to some embodiments.
Figure 8B:
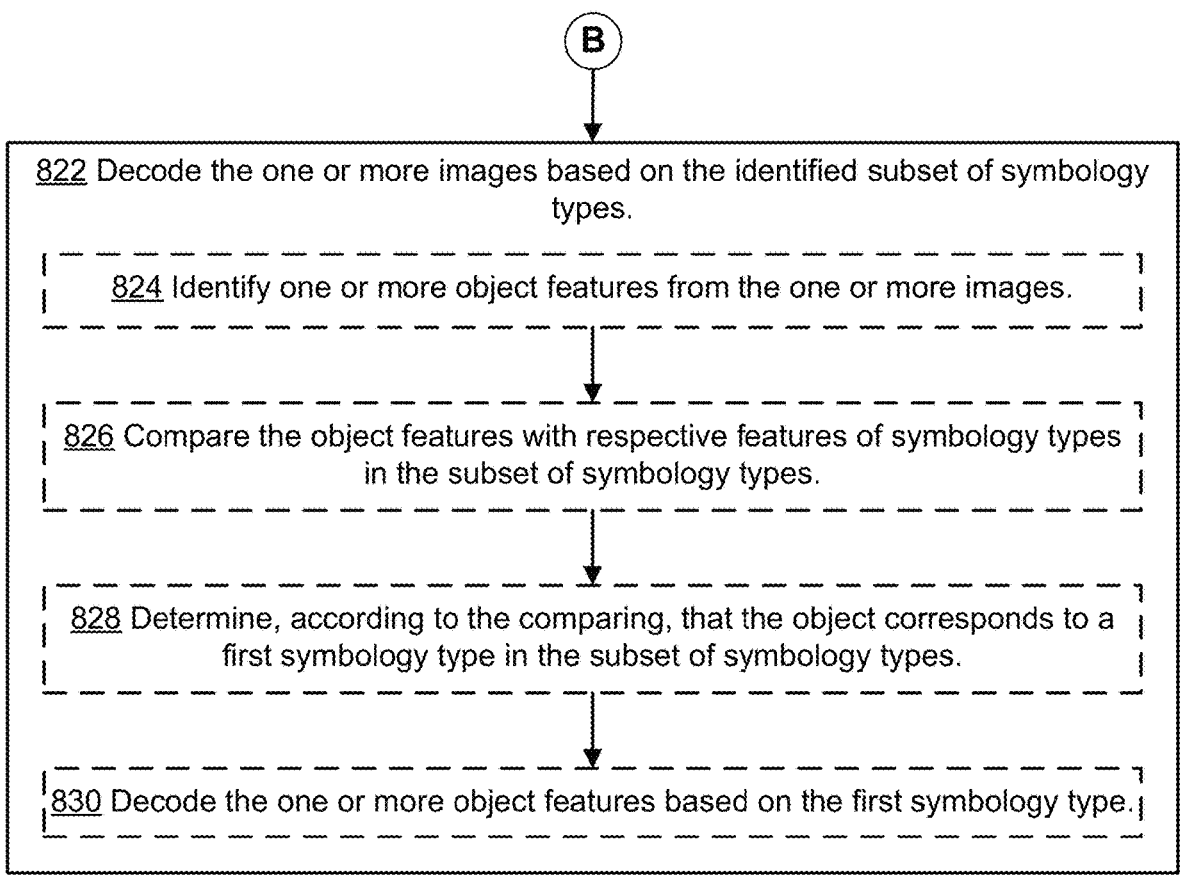

FIGS. 8A and 8B provide a flowchart of a method 800. The method 800 is performed by (e.g., performed at or performed using) an apparatus 100 that has one or more distance sensors 104, a plurality of light sources 110, one or more processors 202, and memory 206. The memory 206 stores one or more programs configured for execution by the one or more processors 202. In some embodiments, the operations shown in FIGS. 1, 2, 3, 4A, 4B, 5, 6A, and 6B correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 800 may be combined and/or the order of some operations may be changed.

The apparatus 100 determines (802), via the distance sensor 104, the distance between an object (e.g., a label, a barcode, or a code) and the apparatus.

When the distance (e.g., separation) between the object and the apparatus 100 is within a first distance range of a plurality of predefined distance ranges, the apparatus 100 identifies (804) (e.g., determines, automatically and without user intervention) a subset of one or more symbology types (e.g., barcode types or barcode symbology types), from a plurality of predefined symbology types, corresponding to the first distance range.

In some embodiments, the plurality of distance ranges includes (806) two or more of: a near field distance range (e.g., 0 to 20 mm), a medium field distance range (e.g., 20 mm to 60 mm), and a far field distance range (e.g., >60 mm or 60 mm to 250 mm).

In some embodiments, the plurality of symbology types is stored (808) locally on the apparatus 100.

In some embodiments, the plurality of symbology types is stored (810) on a computer device (e.g., that is communicatively coupled to the apparatus 100), distinct from the apparatus.

In some embodiments, the plurality of symbology types includes (812) a linear (e.g., one-dimensional) symbology and a 2D symbology (e.g., a QR code).

In some embodiments, when the distance between the object and the apparatus 100 is within the first distance range, the apparatus 100 activates (814) (e.g., automatically, without user intervention) a first sequence of lighting patterns, corresponding to the first distance range, to illuminate the object via the plurality of light sources. In some embodiments, lighting patterns in the first sequence of lighting patterns have a predefined order. Details of lighting patterns and the sequence of lighting patterns are discussed with respect to FIGS. 7A and 7B, and are not repeated for the sake of brevity.

In some embodiments, the apparatus 100 acquires (816) (e.g., captures) one or more images of the object In some embodiments, the apparatus 100 adjusts (818) (e.g., varies, determines, or selects from predetermined rates) the image acquisition rate (e.g., the frame rate) for acquiring the one or more images based on the distance between the apparatus and the object.

In some instances, the apparatus 100 increases (820) the image acquisition rate when the distance between the apparatus and the object increases.

For example, in some embodiments, the image acquisition rate increases (e.g., is faster) at longer distances because codes are expected to contain less data. In some embodiments, the image acquisition rate increases at longer distances because the codes have elements that are bigger in size, thereby leading to faster processing times.

In some embodiments, the apparatus 100 decreases the image acquisition rate when the distance between the apparatus and the object decreases. For example, the frame rate decreases (e.g., is slower) while reading labels up close to the apparatus 100, because the image sensor resolves smaller elements in dense codes.

With continued reference to FIG. 8B, the apparatus 100 decodes (822) the one or more images based on the identified subset of symbology types. For example, the apparatus 100 resolves information about the object, including details of the object, elements or features within the object, such as the presence of lines and the thicknesses corresponding to the lines.

In some embodiments, identifying the subset of symbology types from the plurality of symbology types includes disabling (e.g., not testing), one or more other symbology types from the plurality of symbology types that are not typically used for the determined distance.

For example, in some circumstances, certain symbologies would not be found in applications where long-range reading is required. As an example, a MicroQR code is not typically selected as the label symbology printed on the side of a pallet of goods, but is good for small electronics or electronic components. Therefore, in some embodiments, when the distance between the apparatus and the object is at a long range (e.g., the far field range), the apparatus 100 eliminates the MicroQR code type from its list of possible symbology candidates.

As another example, for a code type with very wide (or very long) codes, the apparatus 100 needs to be positioned far enough away from the code so that the entire code can fit the field of view of the image sensor 212. Therefore, symbology types that are associated with long or wide codes can be eliminated when the apparatus 100 is positioned close to an object (e.g., in the near field range).

In some embodiments decoding the one or more images based on the identified subset of symbology types includes identifying (824) one or more object features from the one or more images. For example, in some embodiments, the object is a barcode and the object features include widths of bars of the barcode, widths of spaces between bars of the barcode, the length of the barcode, the width of the barcode, and/or the ratio between the length and the width of the barcode.

In some embodiments, the decoding includes comparing (826) the object features with respective features of symbology types in the subset of symbology types, determining (828), according to the comparing, that the object corresponds to a first symbology type in the subset of symbology types, and decoding (830) the one or more object features based on the first symbology type.

Figure 9A:
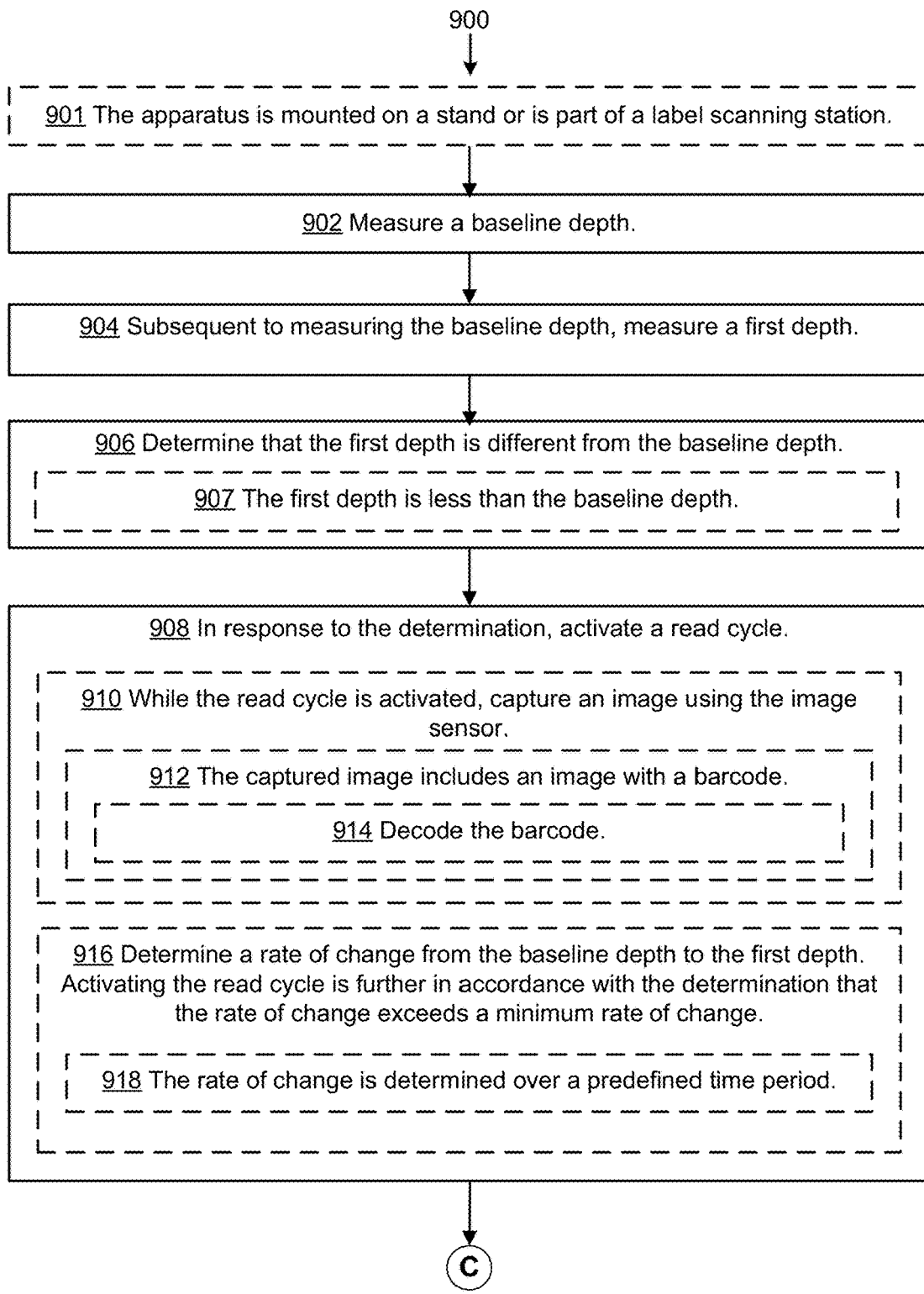
FIGS. 9A and 9B provide a flowchart of a method according to some embodiments.
Figure 9B:
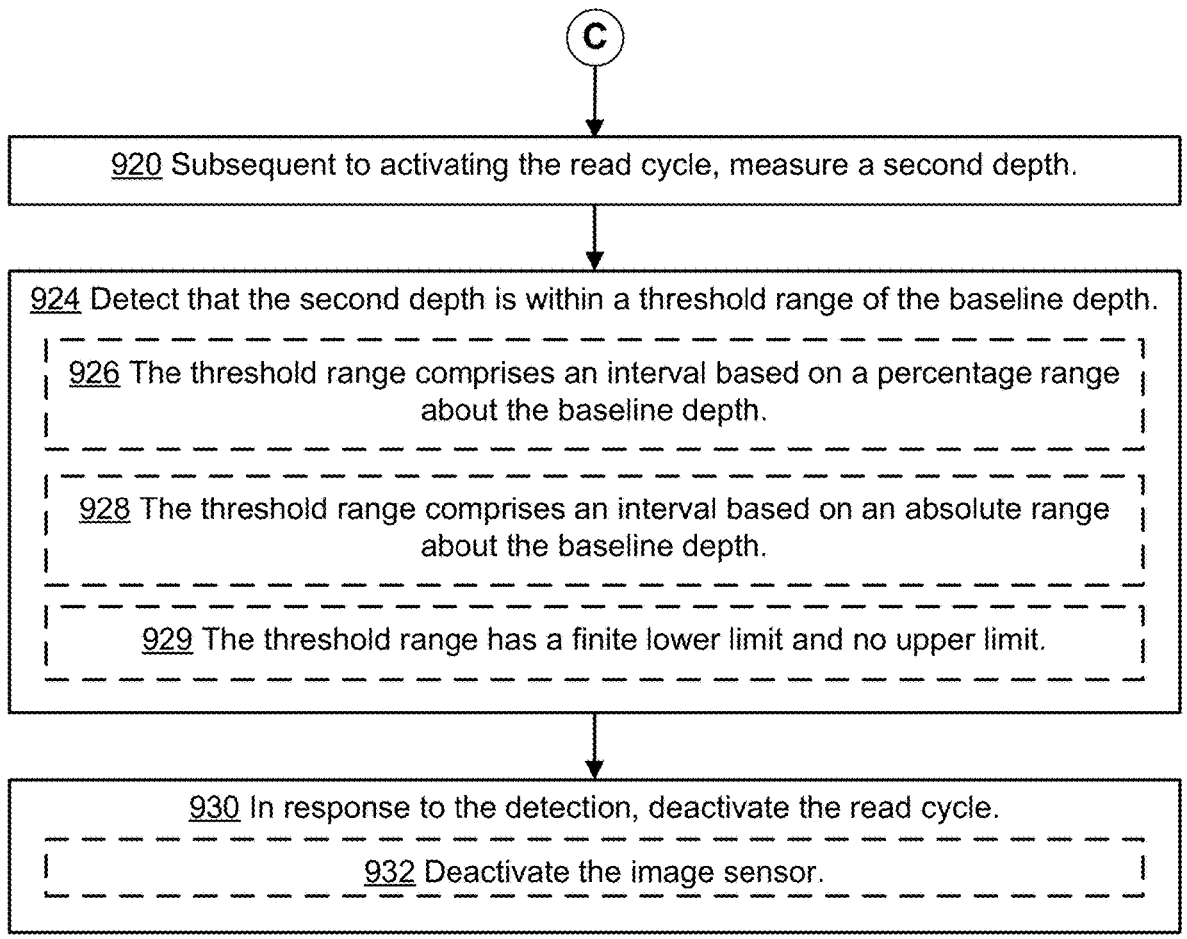

FIGS. 9A and 9B provide a flowchart of a method 900. The method 900 is performed by (e.g., performed at or performed using) an apparatus 100 that has a one or more distance sensors 104, an image sensor 212, one or more processors 202, and memory 206. The memory 206 stores one or more programs configured for execution by the one or more processors 202. In some embodiments, the operations shown in FIGS. 1, 2, 3, 4A, 4B, 5, 6A, and 6B correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 900 may be combined and/or the order of some operations may be changed.

In some embodiments, the distance sensor 104 is one of: a time-of-flight sensor, an ultrasonic sensor, an infrared (IR) sensor, a radar sensor, or a LiDAR sensor.

In some embodiments, the apparatus 100 is mounted (901) on a stand. In some embodiments, the apparatus 100 is part of a label scanning station.

The apparatus 100 measures (902) (e.g., obtains) (e.g., using the distance sensor) a baseline depth. In some embodiments, the baseline depth is also referred to as a "distance" or a "return to home" distance. For example, the baseline depth can be 100 mm, 150 mm, 220 mm, or 250 mm.

Subsequent to measuring the baseline depth, the apparatus 100 measures (904) (e.g., using the distance sensor 104) a first depth.

The apparatus 100 determines (906) that the first depth is different from the baseline depth.

In some embodiments, the first depth is (907) less than the baseline depth (e.g., the baseline depth is 100 mm and the first depth is 20 mm). In some embodiments, the decrease in the distance reported represents a "rising edge detected" event.

In response to the determination, the apparatus 100 activates (908) a read cycle.

In some embodiments, while the read cycle is activated, the apparatus 100 captures (910) an image using the image sensor. For example, the apparatus 100 uses a camera 211 that includes the image sensor 212 to capture an image of an object that is within the field of view of the image sensor.

In some embodiments, the captured image includes (912) an image with a barcode (e.g., a label or a part marking).

In some embodiments, in a read cycle, the apparatus 100 captures an image and evaluates the quality of the image. Depending on the image quality, the apparatus either processes (e.g., decodes) the image or recaptures another image.

In some embodiments, the method 900 further comprises decoding (914) the barcode.

In some embodiments, the apparatus 100 determines (916) a rate of change from the baseline depth to the first depth (e.g., according to signals from the distance sensor 104). Activating the read cycle is further in accordance with the determination that the rate of change exceeds a minimum rate of change (or is at least equal to the minimum rate of change) (e.g., 10 mm/s or greater).

In some embodiments, the apparatus 100 determines a rate of change from the baseline depth to the first depth. Activating the read cycle is further in accordance with the determination that the rate of change from the baseline depth to the first depth is within (e.g., between) a threshold range (e.g., between 20 mm/s and 100 mm/s).

In some embodiments, the rate of change is determined (918) (e.g., by the apparatus 100) over a predefined time period. For example, in some embodiments, the distance sensor 104 is configured to measure a distance at a predetermined time interval (e.g., every 30 milliseconds or every 50 milliseconds). If the rate of change over the predetermined time interval is small (e.g., a user moves the object to the apparatus very slowly), the read cycle will not start. On the other hand, if the rate of change over the predetermined time interval is too large, it may be due to other reasons, such as a user accidentally knocking on the table on which the apparatus is mounted.)

With continued reference to FIG. 9B, in some embodiments, subsequent to activating the read cycle, the apparatus 100 measures (920) a second depth.

The apparatus 100 detects (924) that the second depth is within a threshold range of the baseline depth.

In some embodiments, the threshold range comprises (926) an interval based on a percentage range (e.g., ±2%, ±3%, ±5%, or ±8%) about the baseline depth.

In some embodiments, the threshold range comprises (928) an interval based on an absolute range (e.g., ±2 mm or ±5 mm) about the baseline depth.

In some embodiments, the threshold range has (930) a finite lower limit and no upper limit. For example, the threshold range can be one-sided (e.g., has a one-sided range) (e.g., 95 mm or more, or 99 mm or more).

In response to the detection, the apparatus 100 deactivates (930) the read cycle.

In some embodiments, deactivating the read cycle includes deactivating (932) the image sensor.

In some embodiments, a read cycle can have a predetermined amount of time or a predetermined number of cycles (e.g., one, three, or ten).

In some embodiments, the read cycle comprises a continuous read cycle (e.g., continuous mode), in which the camera continuously captures images for evaluation and/or processing.

In some embodiments, the read cycle comprises a one-time loop, in which the apparatus acquires one image, evaluates the image, and determines, based on the evaluation, whether to process or disregard the image.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method performed by an apparatus having a distance sensor, an image sensor, one or more processors, and memory, the method comprising:
measuring a baseline depth representing a distance from the apparatus to a surface, the baseline depth is used to determine activation and deactivation of a read cycle of the apparatus;
subsequent to measuring the baseline depth, measuring a first depth;
determining whether the first depth is different from the baseline depth;
in response to the determination that the first depth is different from the base line depth, activating a read cycle to capture an image, the first depth representing a distance from the apparatus to an object;
subsequent to activating the read cycle, measuring a second depth;
detecting whether the second depth is within a threshold range of the baseline depth; and
in response to the detection that the second depth is within a threshold range of the baseline depth, deactivating the read cycle to stop image capture and image processing, the second depth representing a new distance from the apparatus to the surface.

2. The method of claim 1, wherein the first depth is less than the baseline depth.

3. The method of claim 1, further comprising:
while the read cycle is activated, capturing an image using the image sensor.

4. The method of claim 3, wherein the captured image includes an image with a barcode.

5. The method of claim 4, further comprising decoding the barcode.

6. The method of claim 1, wherein the threshold range comprises an interval based on a percentage range about the baseline depth.

7. The method of claim 1, wherein the threshold range comprises an interval based on an absolute range about the baseline depth.

8. The method of claim 1, wherein the threshold range has a finite lower limit and no upper limit.

9. The method of claim 1, wherein deactivating the read cycle includes deactivating the image sensor.

10. The method of claim 1, further comprising:
determining a rate of change from the baseline depth to the first depth,
wherein the activating the read cycle is further in accordance with the determination that the rate of change exceeds a minimum rate of change.

11. The method of claim 10, wherein the rate of change is determined over a predefined time period.

12. The method of claim 1, wherein the distance sensor is one of: a time-of-flight sensor, an ultrasonic sensor, an infrared (IR) sensor, a radar sensor, or a LIDAR sensor.

13. The method of claim 1, wherein the apparatus is mounted on a stand.

14. The method of claim 1, wherein the apparatus is part of a label scanning station.

15. An apparatus, comprising:
a distance sensor;
an image sensor;
one or more processors; and
memory coupled to the one or more processors, the memory storing one or more programs configured for execution by the one or more processors, the one or more programs including instructions for:
measuring a baseline depth representing a distance from the apparatus to a surface, the baseline depth is used to determine activation and deactivation of a read cycle of the apparatus;
subsequent to measuring the baseline depth, measuring a first depth;
determining whether the first depth is different from the baseline depth;

in response to the determination that the first depth is different from the base line depth, activating a read cycle to capture an image, the first depth representing a distance from the apparatus to an object;

subsequent to activating the read cycle, measuring a second depth;

detecting whether the second depth is within a threshold range of the baseline depth; and in response to the detection that the second depth is within a threshold range of the baseline depth, deactivating the read cycle to stop image capture and image processing, the second depth representing a new distance from the apparatus to the surface.

16. The apparatus of claim 15, wherein the first depth is less than the baseline depth.

17. The apparatus of claim 15, wherein the one or more programs further include instructions for:

capturing an image using the image sensor while the read cycle is activated.

18. The apparatus of claim 15, wherein the distance sensor is one of: a time-of-flight sensor, an ultrasonic sensor, an infrared (IR) sensor, a radar sensor, or a LIDAR sensor.

19. The apparatus of claim 15, wherein the one or more programs further include instructions for:

determining a rate of change from the baseline depth to the first depth, wherein the activating the read cycle is further in accordance with the determination that the rate of change exceeds a minimum rate of change.

20. The apparatus of claim 15, wherein the apparatus is mounted on a stand or is part of a label scanning station.

* * * * *